US012791960B2

(12) United States Patent
Kato et al.

(10) Patent No.: US 12,791,960 B2
(45) Date of Patent: Nov. 10, 2026

(54) LIGHT SCANNING APPARATUS

(71) Applicant: CANON KABUSHIKI KAISHA, Tokyo (JP)

(72) Inventors: Hayato Kato, Tochigi (JP); Kazumi Kimura, Saitama (JP); Hiroki Yoshida, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 18/430,226

(22) Filed: Feb. 1, 2024

(65) Prior Publication Data

US 2024/0264550 A1 Aug. 8, 2024

(30) Foreign Application Priority Data

Feb. 6, 2023 (JP) ................................ 2023-015789

(51) Int. Cl.
*G03G 15/041* (2006.01)
*G03G 15/04* (2006.01)

(52) U.S. Cl.
CPC ..... *G03G 15/0415* (2013.01); *G03G 15/0409* (2013.01); *G03G 2215/0404* (2013.01)

(58) Field of Classification Search
None
See application file for complete search history.

(56) References Cited

U.S. PATENT DOCUMENTS

2018/0059572 A1* 3/2018 Kimura ................ G02B 26/123
2022/0100118 A1* 3/2022 Kimura ................ G03G 15/043
2024/0353673 A1* 10/2024 Kato .................. G02B 26/0816
2025/0164780 A1* 5/2025 Sato ..................... G02B 26/105

FOREIGN PATENT DOCUMENTS

JP 2022055826 A 4/2022

* cited by examiner

*Primary Examiner* — Ryan Crockett
(74) *Attorney, Agent, or Firm* — Canon U.S.A., Inc. IP Division

(57) ABSTRACT

Provided is an apparatus including: a deflecting unit configured to deflect a light flux from a light source to scan a scanned surface in a main scanning direction while rotating at a constant angular velocity; and an optical system configured to guide the deflected light flux onto the scanned surface, wherein, in a main scanning cross section including an optical axis of the optical system, a width of the light flux on a deflecting surface of the deflecting unit is larger than a width of the deflecting surface, wherein a scanning speed of the light flux on the scanned surface is highest at an on-axis image height, and wherein an absolute value of a scanning acceleration of the light flux on the scanned surface increases monotonically from the on-axis image height toward an outermost off-axis image height.

20 Claims, 5 Drawing Sheets

LIGHT SCANNING APPARATUS

BACKGROUND

Technical Field

The aspect of the embodiments relates to a light scanning apparatus, which is particularly suitable for use in an image forming apparatus that uses an electrophotographic process, such as a laser beam printer and a multi-function printer.

Description of the Related Art

Hitherto, in order to achieve increases in speed and definition in printing, a so-called overfilled scan type light scanning apparatus, which includes a deflecting unit formed by a deflecting surface having a width smaller than a width of an incident light flux in a main scanning direction, is used.

In such a light scanning apparatus, when the deflecting surface moves while changing its angle with respect to the incident light flux, the width and energy of the light flux deflected by the deflecting surface change in accordance with the angle of the deflecting surface, and hence a spot diameter changes and an illuminance also changes in accordance with an image height on a scanned surface.

In Japanese Patent Application Laid-Open No. 2022-55826, there is disclosed a light scanning apparatus with which variations in the spot diameter and the illuminance in accordance with the image height are suppressed by changing a refractive power of an imaging optical system in a main scanning cross section in accordance with a scanning angle so that a scanning speed at an outermost off-axis image height is higher than a scanning speed at an on-axis image height on a scanned surface.

In the light scanning apparatus as disclosed in Japanese Patent Application Laid-Open No. 2022-55826, in order to suppress variations in the spot diameter and the illuminance on the scanned surface in accordance with the image height while achieving downsizing, the refractive power on one side with respect to an optical axis of the imaging optical system is mainly changed in accordance with the scanning angle.

That is, in the light scanning apparatus as disclosed in Japanese Patent Application Laid-Open No. 2022-55826, a scanned region on the other side with respect to the optical axis of the imaging optical system is hardly used, and hence a sufficient scanned region is not secured.

SUMMARY

According to the aspect of the embodiments, there is provided an apparatus including: a deflecting unit configured to deflect a light flux from a light source to scan a surface in a main scanning direction while rotating at a constant angular velocity; and an optical system configured to guide the deflected light flux onto the scanned surface, wherein, in a main scanning cross section including an optical axis of the optical system, a width of the light flux on a deflecting surface of the deflecting unit is larger than a width of the deflecting surface, wherein a scanning speed of the light flux on the scanned surface is highest at an on-axis image height, and wherein an absolute value of a scanning acceleration of the light flux on the scanned surface increases monotonically from the on-axis image height toward an outermost off-axis image height.

Further features of the disclosure will become apparent from the following description of exemplary embodiments with reference to the attached drawings.

DESCRIPTION OF THE EMBODIMENTS

A light scanning apparatus according to each embodiment of the disclosure is described in detail below with reference to the accompanying drawings. Some of the drawings referred to below may be drawn in scales different from the actual scale for easier understanding of the embodiments of the disclosure.

In the following description, a main scanning direction refers to a direction perpendicular to a rotational axis of a deflecting unit and an optical axis of an imaging optical system (direction in which a light flux is deflected by the deflecting unit), and a sub-scanning direction refers to a direction parallel to the rotational axis of the deflecting unit. Further, a main scanning cross section refers to a cross section parallel to the main scanning direction and the optical axis of the imaging optical system (perpendicular to the sub-scanning direction), and a sub-scanning cross section refers to a cross section parallel to the sub-scanning direction and the optical axis of the imaging optical system (perpendicular to the main scanning direction).

In the following, a direction parallel to the optical axis of the imaging optical system is defined as an X axis, the main scanning direction is defined as a Y axis, and the sub-scanning direction is defined as a Z axis. Further, the unit of angles is represented by radian (rad).

First Embodiment

Figure 1A:
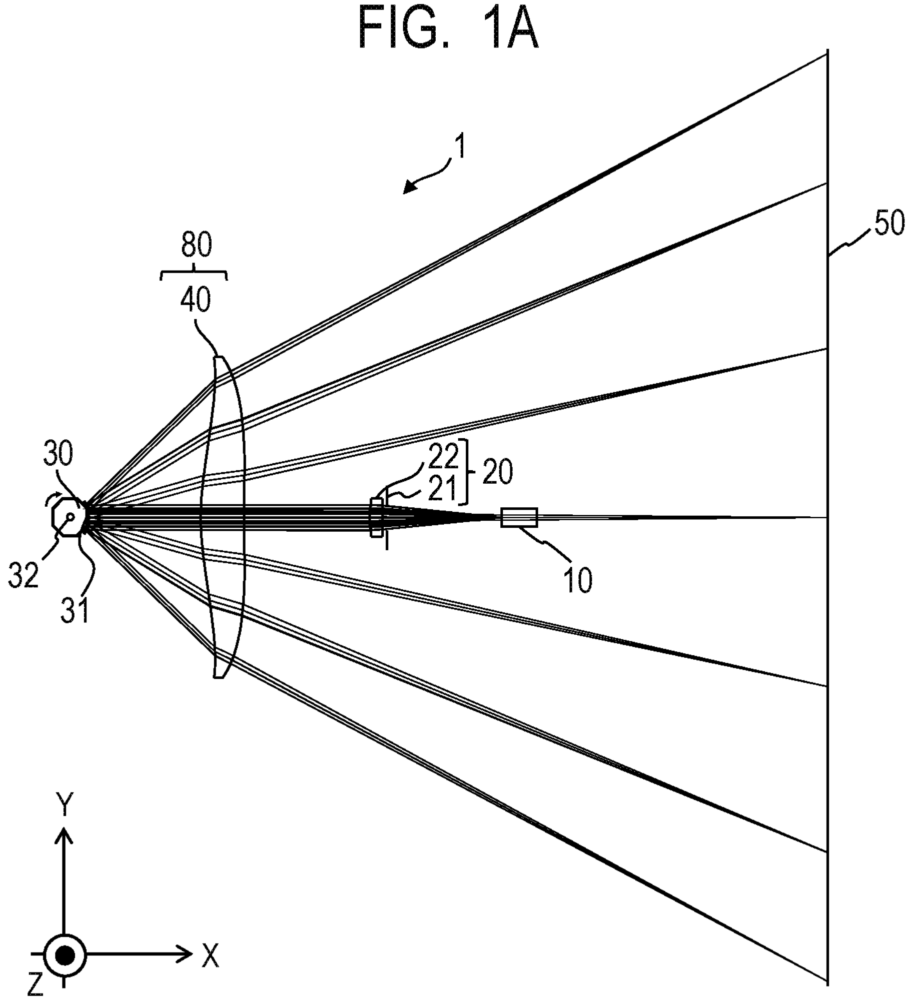
FIG. 1A is a main scanning cross-sectional view of a light scanning apparatus according to a first embodiment of the disclosure.
Figure 1B:
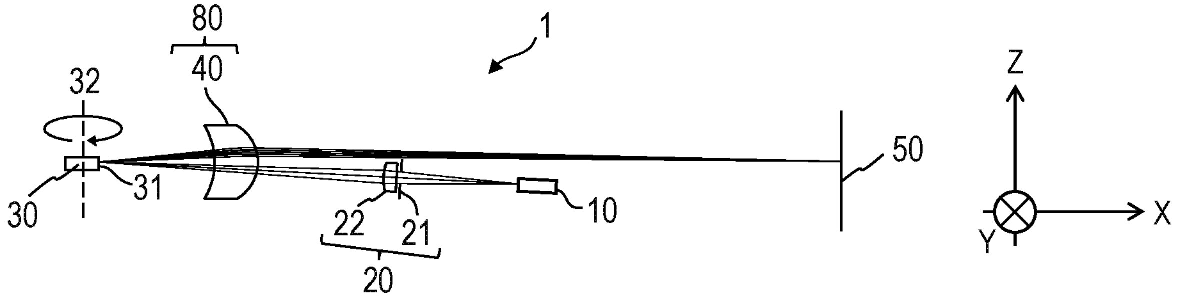
FIG. 1B is a sub-scanning cross-sectional view of the light scanning apparatus according to the first embodiment.

FIG. 1A and FIG. 1B are a main scanning cross-sectional view and a sub-scanning cross-sectional view, respectively, of a light scanning apparatus 1 according to a first embodiment of the disclosure.

The light scanning apparatus 1 according to the first embodiment includes a light source 10, an aperture stop 21, a coupling lens 22, a deflecting unit 30, and an imaging lens 40.

A semiconductor laser can be used as the light source 10, and the number of light emitting units may be one, and may be two or more.

The aperture stop 21 restricts a light flux diameter of a light flux emitted from the light source 10 in each of the main scanning direction and the sub-scanning direction.

In the light scanning apparatus 1 according to the first embodiment, a width of the aperture stop 21 is set to be sufficiently large such that a width of the light flux entering the deflecting unit 30 in the main scanning direction is larger than a width of each deflecting surface 31 of the deflecting unit 30 in the main scanning direction.

The coupling lens 22 is an anamorphic lens having a different refractive power between the sub-scanning cross section and the main scanning cross section.

Further, the coupling lens 22 converts the light flux that has passed through the aperture stop 21 into a parallel light flux in the main scanning cross section, and condenses the light flux such that a focal line is formed at a position close to the deflecting surface 31 of the deflecting unit 30 in the sub-scanning cross section.

The parallel light flux as used herein includes not only a strictly parallel light flux, but also a substantially parallel light flux, such as a weakly convergent light flux and a weakly divergent light flux.

The deflecting unit 30 is a polygon mirror having eight deflecting surfaces 31, and is rotated by a driving motor (not shown) at a constant angular velocity about a rotational axis 32, to thereby deflect the light flux that has passed through the coupling lens 22.

In the light scanning apparatus 1 according to the first embodiment, the polygon mirror having eight surfaces is used as the deflecting unit 30, but the disclosure is not limited thereto, and a polygon mirror having seven surfaces or a polygon mirror having six surfaces may also be used as required.

The imaging lens 40 guides (condenses) the light flux deflected by the deflecting unit 30 onto a scanned surface 50.

The light flux emitted from the light source 10 provided in the light scanning apparatus 1 according to the first embodiment is shaped by the aperture stop 21, and then is incident on the coupling lens 22.

Subsequently, the light flux that has been incident on the coupling lens 22 is converted into the parallel light flux in the main scanning cross section, and is condensed such that a focal line is formed at a position close to the deflecting surface 31 of the deflecting unit 30 in the sub-scanning cross section.

Then, the light flux that has been deflected by the deflecting unit 30 after having entered the deflecting unit 30 is guided onto the scanned surface 50 via the imaging lens 40, and the deflecting unit 30 rotates at a constant velocity about the rotational axis 32 to scan the scanned surface 50.

In the light scanning apparatus 1 according to the first embodiment, the aperture stop 21 and the coupling lens 22 form an incident optical system 20.

Further, the imaging lens 40 forms an imaging optical system 80.

As illustrated in FIG. 1B, in the light scanning apparatus 1 according to the first embodiment, the light flux that has passed through the incident optical system 20 is obliquely incident on the deflecting surface 31 of the deflecting unit 30 at a predetermined angle in the sub-scanning cross section (oblique incident optical system).

As illustrated in FIG. 1A, in the light scanning apparatus 1 according to the first embodiment, each of the incident optical system 20 and the imaging optical system 80 is arranged such that a principal ray of the light flux that has passed through the incident optical system 20 is substantially parallel to the optical axis of the imaging optical system 80 when the principal ray is projected onto the main scanning cross section (front-side incident arrangement).

As illustrated in FIG. 1A, the light scanning apparatus 1 according to the first embodiment is configured such that the width of the light flux entering the deflecting unit 30 in the main scanning direction is larger than the width of each deflecting surface 31 of the deflecting unit 30 in the main scanning direction.

Accordingly, the width of the light flux that has been deflected by the deflecting unit 30 in the main scanning direction is determined based on the width of each deflecting surface 31 of the deflecting unit 30 in the main scanning direction. Such a system is called "overfilled scan (OFS) system."

Meanwhile, a scanning system that uses a light flux having a light flux width in the main scanning direction at the time of entering a deflecting unit that is sufficiently smaller than a width of each deflecting surface of the deflecting unit in the main scanning direction is called "underfilled scan (UFS) system."

In the light scanning apparatus using the OFS system (hereinafter referred to as "OFS light scanning apparatus"), it is easier than in a light scanning apparatus using the UFS system to achieve downsizing even when the number of surfaces of the polygon mirror serving as the deflecting unit is increased.

It is accordingly possible to achieve increases in speed and definition in printing without increasing the size of the light scanning apparatus.

Meanwhile, in the OFS light scanning apparatus, the deflecting surface of the deflecting unit moves in the incident light flux while changing its angle, and hence the width and energy of the deflected light flux change in accordance with the angle of the deflecting surface.

Consequently, a spot diameter varies, and an illuminance also varies in accordance with the image height on the scanned surface.

When the spot diameter and the illuminance vary in accordance with the image height on the scanned surface, it becomes difficult to obtain a uniform printed image when the light scanning apparatus is mounted to an image forming apparatus.

In the light scanning apparatus as disclosed in Japanese Patent Application Laid-Open No. 2022-55826, in order to solve the above-mentioned problem while reducing its components, a configuration in which the optical axis of the incident optical system and the optical axis of the imaging optical system are set to be not parallel to each other in a predetermined plane, specifically, in the main scanning cross section is adopted.

Further, variations in the spot diameter and the illuminance in accordance with the image height are suppressed by making the refractive power of the imaging optical system in the main scanning cross section different between the on-axis image height and the outermost off-axis image height such that the scanning speed at the outermost off-axis image height is higher than the scanning speed at the on-axis image height on the scanned surface.

In the light scanning apparatus as disclosed in Japanese Patent Application Laid-Open No. 2022-55826, on a side on which the incident optical system is mainly arranged with reference to the optical axis of the imaging optical system in the main scanning direction (light source side), that is, between a position close to the on-axis image height and the outermost off-axis image height on a +Y side, the refractive power of the imaging optical system is monotonically changed.

Further, a monotonic change in the light flux width caused by a monotonic change in an angle of deflection of the light flux by the deflecting surface is canceled out by the change in the refractive power, to thereby suppress variations in the spot diameter and the illuminance in accordance with the image height on the scanned surface.

Accordingly, in the above-mentioned light scanning apparatus, in order to suppress a variation in the spot diameter in accordance with the image height on a side on which the incident optical system is not arranged (opposite light source side), that is, to the off-axis image height on a −Y side, it is required to monotonically change the refractive power from the outermost off-axis image height on the +Y side to the outermost off-axis image height on the −Y side.

In this case, it is required to provide a special imaging optical system having a shape that is very asymmetrical with respect to the optical axis, and hence it is difficult to achieve satisfactory imaging performance.

For the above-mentioned reason, in the light scanning apparatus as disclosed in Japanese Patent Application Laid-Open No. 2022-55826, the scanned region on the scanned surface is limited only to a region from an angle of view at the position close to the optical axis to an angle of view on one side.

Thus, in order to achieve satisfactory imaging performance while sufficiently securing the size of the scanned region (printed area), it is required to increase the distance between the deflecting surface and the scanned surface, and hence it becomes difficult to sufficiently downsize the light scanning apparatus.

Moreover, in order to shorten the distance between and the deflecting surface and the scanned surface, it is required to sufficiently increase the maximum angle of view on the one side, and in this case, residual aberrations, such as a wavefront aberration and a partial magnification, occur, and hence it becomes difficult to achieve satisfactory imaging performance.

In contrast, in the light scanning apparatus 1 according to the first embodiment, as described above, the light flux that has passed through the incident optical system 20 is obliquely incident on the deflecting surface 31 at the predetermined angle in the sub-scanning cross section, and the principal ray of the light flux is substantially parallel to the optical axis of the imaging optical system 80 when the principal ray is projected onto the main scanning cross section.

With this configuration, as described in detail below, while achieving satisfactory imaging performance by designing the shape of the imaging optical system 80, that is, the imaging lens 40, to be symmetrical with respect to the optical axis, it is possible to suppress variations in the spot diameter and the illuminance caused by the use of the OFS system from the outermost off-axis image height on the +Y side to the outermost off-axis image height on the −Y side.

In addition, by shortening the distance between the deflecting surface 31 and the scanned surface 50 with a configuration that enables the maximum angle of view on the +Y side and the maximum angle of view on the −Y side to be set to values equivalent to each other, it is also possible to achieve downsizing of the light scanning apparatus 1.

Next, various characteristics of the light scanning apparatus 1 according to the first embodiment are shown in Table 1 and Table 2 given below.

TABLE 1

| Characteristic of light source 10 | | | | Arrangement | | |
|---|---|---|---|---|---|---|
| Wavelength | λ (nm) | | 790 | Light source 10 to aperture stop 21 | d11 (mm) | 26.75 |
| Incident optical system 20 | | | | Aperture stop 21 to incident surface of coupling lens 22 | d21 (mm) | 1.00 |
| Angle formed by optical axis of incident optical system 20 with respect to optical axis of imaging optical system 80 | Main scanning cross section | θi1 (rad) | 0.000 | | | |
| | Sub-scanning cross section | θi2 (rad) | 0.052 | Incident surface of coupling lens 22 to exit surface of coupling lens 22 | d22 (mm) | 3.00 |
| Aperture stop 21 | Main scanning cross section | p1 (mm) | 14.00 | | | |
| | Sub-scanning cross section | p2 (mm) | 2.70 | Exit surface of coupling lens 22 to deflecting surface 31 of deflecting unit 30 | d23 (mm) | 62.00 |
| | Refractive index | | | | | |

TABLE 1-continued

| | | | |
|---|---|---|---|
| Coupling lens 22 | | N2 | 1.531 ($\lambda$ = 790 nm) |
| Imaging lens 40 | | N4 | 1.531 ($\lambda$ = 790 nm) |
| Deflecting unit 30 | | | |
| Number of deflecting surfaces 31 | | N | 8 |
| Circumdiameter | | $\varphi$ (mm) | 15.0 |
| Rotation angle from Y0 to Ymax | | $\theta$pmax (rad) | 0.384 |
| Width of deflecting surface 31 | Main scanning cross section | a1 (mm) | 2.32 |
| | Sub-scanning cross section | a2 (mm) | 2.00 |
| Distance from rotational axis 32 to deflecting surface 31 | | d0 (mm) | 6.93 |
| Imaging optical system 80 | | | |
| F$\theta$ coefficient | | | 142.5 |
| DIST coefficient | | $\alpha$3 | −5.87 |
| | | other than $\alpha$3 | 0 |
| Outermost off-axis image height | | Ymax (mm) | ±107 |
| Angle of view of light beam traveling toward Ymax | | $\theta$max (rad) | 0.770 |

| | | |
|---|---|---|
| Deflecting surface 31 of deflecting unit 30 to incident surface of imaging lens 40 | d41 (mm) | 25.91 |
| Incident surface of imaging lens 40 to exit surface of imaging lens 40 | d42 (mm) | 10.00 |
| Exit surface of imaging lens 40 to scanned surface 50 | d43 (mm) | 134.74 |

TABLE 2

| Meridional line shape of coupling lens 22 | | | Meridional line shape of imaging lens 40 | | |
|---|---|---|---|---|---|
| | Incident surface | Exit surface | | Incident surface | Exit surface |
| | +Y side | | | +Y side | |
| R | 0.000 | 15.925 | R | 59.177 | 285.146 |
| KYu | 0.000E+00 | 5.109E+00 | KYu | −9.234E+00 | 2.001E+01 |
| B2u | 0.000E+00 | 0.000E+00 | B2u | 0.000E+00 | 0.000E+00 |
| B4u | 0.000E+00 | −1.463E−04 | B4u | −6.889E−06 | −7.196E−06 |
| B6u | 0.000E+00 | −4.104E−06 | B6u | 9.410E−09 | 4.956E−09 |
| B8u | 0.000E+00 | 0.000E+00 | B8u | −7.414E−12 | −1.783E−12 |
| B10u | 0.000E+00 | 0.000E+00 | B10u | −3.461E−19 | −2.397E−16 |
| B12u | 0.000E+00 | 0.000E+00 | B12u | 0.000E+00 | 0.000E+00 |
| | −Y side | | | −Y side | |
| KYl | 0.000E+00 | 5.109E+00 | KYl | −9.234E+00 | 2.001E+01 |
| B2l | 0.000E+00 | 0.000E+00 | B2l | 0.000E+00 | 0.000E+00 |
| B4l | 0.000E+00 | −1.463E−04 | B4l | −6.889E−06 | −7.196E−06 |
| B6l | 0.000E+00 | −4.104E−06 | B6l | 9.410E−09 | 4.956E−09 |
| B8l | 0.000E+00 | 0.000E+00 | B8l | −7.414E−12 | −1.783E−12 |
| B10l | 0.000E+00 | 0.000E+00 | B10l | 2.620E−15 | −2.397E−16 |
| B12l | 0.000E+00 | 0.000E+00 | B12l | −3.461E−19 | 8.208E−20 |

| Sagittal line shape of coupling lens 22 | | | Sagittal line shape of imaging lens 40 | | |
|---|---|---|---|---|---|
| | Incident surface | Exit surface | | Incident surface | Exit surface |
| | +Y side | | | +Y side | |
| KZu | 0.000E+00 | −9.704E−01 | KZu | 0.000E+00 | 0.000E+00 |
| | −Y side | | | −Y side | |
| KZl | 0.000E+00 | −9.704E−01 | KZl | 0.000E+00 | 0.000E+00 |

TABLE 2-continued

| Meridional line shape of coupling lens 22 | | | Meridional line shape of imaging lens 40 | | |
|---|---|---|---|---|---|
| | Incident surface | Exit surface | | Incident surface | Exit surface |
| | Change in sagittal line R | Change in sagittal line R | | Change in sagittal line R | Change in sagittal line R |
| | +Y side | | | +Y side | |
| r | 0.000 | 10.844 | r | −16.309 | −9.745 |
| E2u | 0.000E+00 | 0.000E+00 | E2u | 4.738E−03 | 1.176E−03 |
| E4u | 0.000E+00 | 2.959E−04 | E4u | 1.767E−06 | −1.285E−06 |
| E6u | 0.000E+00 | −1.625E−05 | E6u | 4.570E−09 | 1.820E−09 |
| E8u | 0.000E+00 | 0.000E+00 | E8u | 1.368E−12 | −1.430E−12 |
| E10u | 0.000E+00 | 0.000E+00 | E10u | −8.180E−17 | 4.242E−16 |
| | −Y side | | | −Y side | |
| E2l | 0.000E+00 | 0.000E+00 | E2l | 4.738E−03 | 1.176E−03 |
| E4l | 0.000E+00 | 2.959E−04 | E4l | 1.767E−06 | −1.285E−06 |
| E6l | 0.000E+00 | −1.625E−05 | E6l | 4.570E−09 | 1.820E−09 |
| E8l | 0.000E+00 | 0.000E+00 | E8l | 1.368E−12 | −1.430E−12 |
| E10l | 0.000E+00 | 0.000E+00 | E10l | 4.242E−16 | 4.242E−16 |

In Table 2, "E-x" means "$\times 10^{-x}$."

In the light scanning apparatus 1 according to the first embodiment, respective meridional line shapes (shapes in the main scanning cross section) of an exit surface of the coupling lens 22, and an incident surface and an exit surface of the imaging lens 40 are represented by the following expression (1).

$$X = \frac{\frac{Y^2}{R}}{1+\sqrt{1-(1+K_Y)\left(\frac{Y}{R}\right)^2}} + B_4Y^4 + B_6Y^6 + B_8Y^8 + B_{10}Y^{10} + B_{12}Y^{12} \quad (1)$$

In the expression (1), a local coordinate system in which a surface vertex which is a point of intersection of each lens surface (optical surface) with the optical axis is set as an origin is used, and a traveling direction of the light flux (that is, the optical axis) is set as the X axis, an axis orthogonal to the X axis in the main scanning cross section is set as the Y axis, and an axis orthogonal to the X axis in the sub-scanning cross section is set as the Z axis.

Further, in the expression (1), R represents a curvature radius (curvature radius of meridional line) in the main scanning cross section, and $K_Y$, $B_4$, $B_6$, $B_8$, $B_{10}$, and $B_{12}$ represent aspherical surface coefficients.

That is, each of the incident surface and the exit surface of the imaging lens 40 has an aspherical shape represented by a function of the 12th degree or less with respect to Y.

Numerical values of the aspherical surface coefficients $K_Y$, $B_4$, $B_6$, $B_8$, $B_{10}$, and $B_{12}$ may be made different between the +Y side and the −Y side.

With this setting, the meridional line shape of the optical surface can be made asymmetrical with respect to the optical axis in the main scanning direction.

In Table 2 given above, the aspherical surface coefficients on the +Y side are represented by $K_{Yu}$, $B_{4u}$, $B_{6u}$, $B_{8u}$, $B_{10u}$, and $B_{12u}$, and the aspherical surface coefficients on the −Y side are represented by $K_{Yl}$, $B_{4l}$, $B_{6l}$, $B_{8l}$, $B_{10l}$, and $B_{12l}$.

Respective sagittal line shapes (shapes in the sub-scanning cross section) of the exit surface of the coupling lens 22, and the incident surface and the exit surface of the imaging lens 40 are represented by the following expression (2).

$$S = \frac{\frac{Z^2}{r'}}{1+\sqrt{1-(1+K_Z)\left(\frac{Z}{r'}\right)^2}} + \sum_{j,k} M_{jk} Y^j Z^k \quad (2)$$

The sagittal line shape as used herein indicates a surface shape in a cross section including a surface normal on the meridional line at each position in the main scanning direction and being perpendicular to the main scanning cross section.

Further, $K_Z$ and $M_{jk}$ in the expression (2) are aspherical surface coefficients. In the light scanning apparatus 1 according to the first embodiment, all of the aspherical surface coefficients $M_{jk}$ are 0 in any optical surface, but the disclosure is not limited thereto. That is, in order to reduce various aberrations, at least one of the aspherical surface coefficients $M_{jk}$ may be set to a value other than 0.

Specifically, a first-degree term with respect to Z in the expression (2) is a term contributing to a tilt amount (tilt amount of sagittal line) of the optical surface in the sub-scanning cross section.

Accordingly, the tilt amount of the sagittal line can be changed asymmetrically in the main scanning direction by making the aspherical surface coefficients $M_{0\_1u}$ to $M_{16\_1u}$ on the +Y side and the aspherical surface coefficients $M_{0\_1l}$ to $M_{16\_1l}$ on the −Y side different from each other.

Further, r' shown in the expression (2) represents a curvature radius (curvature radius of sagittal line) in the sub-scanning cross section at a position away from the optical axis by Y in the main scanning direction, and is represented by the following expression (3).

$$\frac{1}{r'} = \frac{1}{r} + E_2Y^2 + E_4Y^4 + E_6Y^6 + E_8Y^8 + E_{10}Y^{10} \quad (3)$$

In the expression (3), "r" represents a curvature radius of the sagittal line on the optical axis, and $E_2$, $E_4$, $E_6$, $E_8$, and $E_{10}$ represent aspherical surface coefficients (variation coefficients of sagittal line).

Numerical values of the aspherical surface coefficients $E_2$ to $E_{10}$ may be made different between the +Y side and the −Y side.

With this setting, an aspherical surface amount of the sagittal line shape can be set asymmetrically with respect to the optical axis in the main scanning direction.

In Table 2 given above, the aspherical surface coefficients on the +Y side are represented by $E_{2u}$, $E_{4u}$, $E_{6u}$, $E_{5u}$, and $E_{10u}$, and the aspherical surface coefficients on the −Y side are represented by $E_{2l}$, $E_{4l}$, $E_{6l}$, $E_{8l}$, and $E_{10l}$.

Although the expression (3) includes only even-degree terms with respect to Y, odd-degree terms with respect to Y may be added.

Next, a characteristic configuration in the light scanning apparatus 1 according to the first embodiment is described.

As described above, in the light scanning apparatus 1 according to the first embodiment, the OFS system in which each deflecting surface 31 deflects the light flux having a wide light flux width in the main scanning direction while moving in the light flux is used.

Accordingly, the light flux width in the main scanning direction of the light flux traveling toward each image height on the scanned surface 50 changes in accordance with an angle θ of deflection by each deflecting surface 31.

Specifically, the light flux width in the main scanning direction of the light flux entering each position of the imaging lens 40 in the main scanning direction monotonically decreases from the light flux entering the on-axis image height to the light flux entering the outermost off-axis image height (on the +Y side or the −Y side).

In other words, the light flux width in the main scanning direction of the light flux entering each position of the imaging lens 40 in the main scanning direction is largest in the light flux entering the on-axis image height, and gradually decreases as the light flux becomes closer to the outermost off-axis image height.

Meanwhile, the incident surface and the exit surface of the imaging lens 40 have aspherical shapes, and are designed such that the focal length changes in accordance with a position in the main scanning direction.

Specifically, the refractive power of the imaging lens 40 in the main scanning cross section is made different between the on-axis image height and the outermost off-axis image height such that the scanning speed at the outermost off-axis image height is lower than the scanning speed at the on-axis image height on the scanned surface 50.

In the light scanning apparatus 1 according to the first embodiment, through adoption of the above-mentioned configuration, as described in detail below, it is possible to suppress a variation in the spot diameter in the main scanning direction on the scanned surface 50.

As described above, the light scanning apparatus 1 according to the first embodiment adopts the OFS system, and hence the light flux width in the main scanning direction of the light flux deflected by each deflecting surface 31 of the deflecting unit 30 changes in accordance with the angle of view θ.

When a circumdiameter of the deflecting unit 30 is represented by φ and the number of the deflecting surfaces 31 of the deflecting unit 30 is represented by N, a width $W_0$ of each deflecting surface 31 in the main scanning cross section is represented by the following expression (4).

$$W_0 = \phi \sin\left(\frac{\pi}{N}\right) \tag{4}$$

Further, an angle formed by a normal of the deflecting surface 31 with respect to the optical axis of the imaging optical system 80 is represented by $\theta_p$, and an angle formed by a traveling direction of the principal ray of the light flux traveling toward a predetermined image height when the light flux is deflected by the deflecting surface 31 with respect to the optical axis of the imaging optical system 80 (that is, angle of view) is represented by θ.

In this case, a light flux width W in the main scanning direction of the light flux deflected by each deflecting surface 31 is represented by the following expression (5).

$$W = W_0 \cos\theta_p = W_0 \cos\left(\frac{\theta}{2}\right) \tag{5}$$

From the expression (5), the light flux width W in the main scanning direction of the light flux entering each position of the imaging optical system 80 in the main scanning direction monotonically decreases as the angle $\theta_p$ increases, that is, from the on-axis image height (θ=0) to the outermost off-axis image height (on the +Y side or the −Y side) ($\theta=\theta_{max+}$, $\theta_{max-}$).

Further, a spot diameter SPOT in the main scanning direction at each image height on the scanned surface 50 is represented by the following expression (6).

$$SPOT = \frac{K \times \lambda \times f}{W} \tag{6}$$

In the expression (6), K represents a constant, λ represents a wavelength of the light flux emitted from the light source 10, and “f” represents a focal length of the imaging optical system 80.

The constant K is estimated to be 1.44 when a cross-sectional shape of the light flux entering the imaging optical system 80 is rectangular.

The light scanning apparatus 1 according to the first embodiment adopts the OFS system as described above, and the light flux width W is represented by the expression (5), and hence the following expression (7) is obtained by substituting the expression (5) into the expression (6).

$$SPOT = \frac{K \times \lambda \times f}{W_0 \cos\left(\frac{\theta}{2}\right)} \tag{7}$$

Next, in a related-art OFS light scanning apparatus as a comparative example, the imaging optical system 80 is set such that a distortion characteristic (hereinafter referred to as “DIST characteristic”) represented by the following expression (8) is satisfied between the image height Y and the angle of view θ.

$$Y = F\theta \tag{8}$$

In the expression (8), F is called an Fθ coefficient of the imaging optical system 80, and is equal to the focal length f(θ=0) at an on-axis position of the imaging optical system 80.

The related-art OFS light scanning apparatus has the same configuration as that of the light scanning apparatus 1 according to the first embodiment except that the DIST characteristic of the imaging optical system 80 differs therebetween, and hence the same members are denoted by the same reference numerals and description thereof is omitted.

That is, in the related-art OFS light scanning apparatus, an amount of change dθ in the angle of view θ caused by the deflecting unit 30 which rotates at a constant velocity and a distance dY by which the spot scans on the scanned surface 50 when the angle of view θ changes by the amount of change dθ has a relationship of constant velocity scanning represented by the following expression (9).

$$\frac{dY}{d\theta} = F \tag{9}$$

Further, a distance by which the spot scans on the scanned surface 50 per unit time, that is, a scanning speed dY/dt of the spot on the scanned surface 50, is represented by the following expression (10).

$$\frac{dY}{dt} = \left(\frac{dY}{d\theta}\right)\left(\frac{d\theta}{dt}\right) = F\left(\frac{d\theta}{dt}\right) \tag{10}$$

In this case, the deflecting unit 30 rotates at a constant velocity about the rotational axis 32, and hence dθ/dt is a constant.

Thus, in the related-art OFS light scanning apparatus, the scanning speed dY/dt of the spot on the scanned surface 50 does not change in accordance with the angle of view θ, that is, the image height Y.

Next, a ratio of the light flux width in the main scanning direction of the light flux entering each position of the imaging optical system 80 in the main scanning direction with respect to the light flux width in the main scanning direction of the light flux entering the on-axis position of the imaging optical system 80 is represented by dW(θ).

Further, a ratio of the spot diameter in the main scanning direction at each image height on the scanned surface 50 with respect to the spot diameter in the main scanning direction at the on-axis image height on the scanned surface 50 is represented by dSPOT(θ).

In this case, the following expression (11) is obtained based on the expression (6).

$$dSPOT(\theta) = \frac{1}{dW(\theta)} \tag{11}$$

As shown in the expression (11), in the related-art OFS light scanning apparatus, the ratio dSPOT(θ) of the spot diameter at each angle of view depends on the ratio dW(θ) of the light flux width at each angle of view.

Accordingly, a variation of the light flux width W causes a variation of the spot diameter SPOT in the main scanning direction.

Figures 2A, 2B, 2C, 2D:
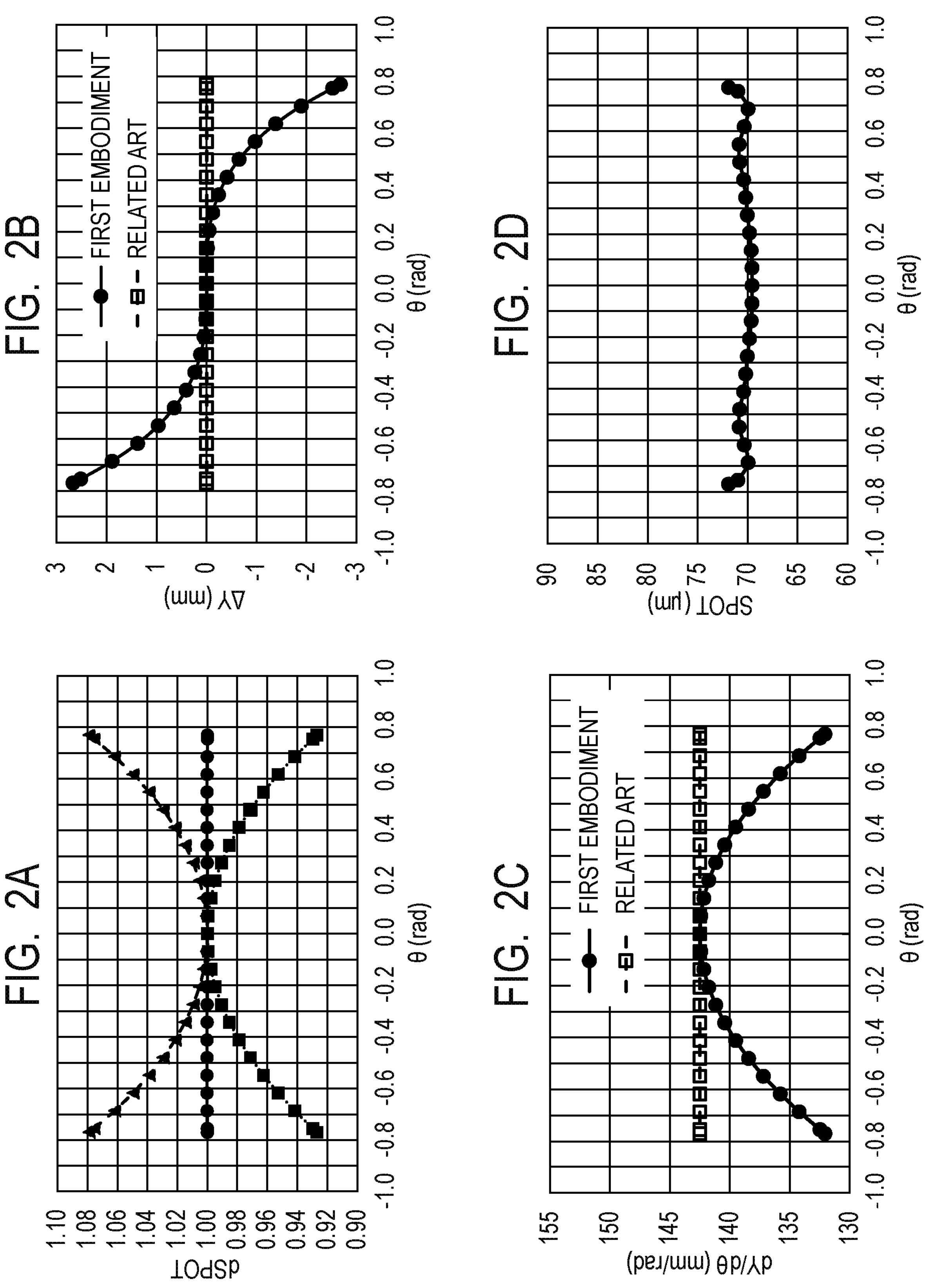
FIG. 2A is a graph for showing a change in a ratio of a spot diameter in the light scanning apparatus according to the first embodiment.
FIG. 2B is a graph for showing a DIST characteristic in the light scanning apparatus according to the first embodiment.
FIG. 2C is a graph for showing a change in a spot movement speed in the light scanning apparatus according to the first embodiment.
FIG. 2D is a graph for showing a change in a spot diameter in the light scanning apparatus according to the first embodiment.

Further, based on the expression (11), dependence of the ratio dSPOT of the spot diameter in the main scanning direction on the angle of view θ in the related-art OFS light scanning apparatus is indicated by the broken line of FIG. 2A.

As shown in FIG. 2A, in the related-art OFS light scanning apparatus, each of the ratio dSPOT($\theta_{max+}$) and the ratio dSPOT($\theta_{max-}$) of the spot diameter at the outermost off-axis image height with respect to the spot diameter at the on-axis image height on the scanned surface 50 is about 1.07.

It is thus found that, in the related-art OFS light scanning apparatus, a variation of the light flux width W causes a variation of the spot diameter.

In contrast, in the light scanning apparatus 1 according to the first embodiment, the imaging optical system 80 is set such that a DIST characteristic represented by the following expression (12) is satisfied between the image height Y and the angle of view θ.

$$Y = F\theta + \sum_{i=2} \alpha_i \theta^i \tag{12}$$

In the expression (12), $\alpha_i$ (where "i" represents an integer of 2 or more) represents a DIST coefficient of degree "i" of the imaging optical system 80. In the light scanning apparatus 1 according to the first embodiment, $\alpha_3$ has a negative value ($\alpha_3<0$), and for example, $\alpha_3$ is −5.87 as shown in Table 1. Further, in the light scanning apparatus 1 according to the first embodiment, the value of $\alpha_i$ other than $\alpha_3$ is 0.

The disclosure is not limited to the above, and the effect of the disclosure can be obtained as long as the following conditional expressions (13) and (14) are satisfied and at least one of $\alpha_{2j+1}$ has a negative value.

$$\alpha_{2j} = 0 \tag{13}$$

$$\alpha_{2j+1} \leq 0 \tag{14}$$

In the conditional expressions (13) and (14), "j" represents an integer of 1 or more.

Further, based on each of the expression (8) and the expression (12), dependence of the image height Y on the angle of view θ in each of the related-art OFS light scanning apparatus and the light scanning apparatus 1 according to the first embodiment is shown in FIG. 2B.

Specifically, in FIG. 2B, an amount of difference ΔY from the image height in the related-art OFS light scanning apparatus at each angle of view θ in each of the related-art OFS light scanning apparatus and the light scanning apparatus 1 according to the first embodiment is shown.

As shown in FIG. 2B, in the light scanning apparatus 1 according to the first embodiment, the imaging optical system 80 having the DIST characteristic in which the position of the outermost off-axis image height is moved by about 3 mm toward the on-axis image height side as compared with the related-art OFS light scanning apparatus is set.

Further, the amount of change dθ in the angle of view θ caused by the deflecting unit 30 which rotates at a constant velocity and the distance dY by which the spot scans on the scanned surface 50 when the angle of view θ changes by the amount of change dθ has a relationship represented by the following expression (15).

$$\frac{dY}{d\theta} = F + \sum_{i=2} i\alpha_i \theta^{i-1} \tag{15}$$

Coordinates in the main scanning direction of the on-axis image height (θ=0) and the outermost off-axis image height ($\theta=\theta_{max}$) on the scanned surface 50 are represented by Y(0) and Y($\theta_{max}$), respectively.

In this case, a value of a ratio of the scanning speed of the spot at the on-axis image height with respect to the scanning speed of the spot at the outermost off-axis image height on the scanned surface 50 is represented by the following expression (16) through use of the expression (15).

$$\frac{\frac{dY(0)}{d\theta}}{\frac{dY(\theta_{max})}{d\theta}} = \frac{F}{F + \sum_{i=2} i a_i \theta_{max}^{i-1}} \tag{16}$$

In the light scanning apparatus 1 according to the first embodiment, $a_3$=−5.87 and $\alpha_i$=0 (where i≠3) as shown in Table 1, and hence the value of the expression (16) is larger than 1.

That is, as a characteristic configuration of the light scanning apparatus 1 according to the first embodiment, the imaging optical system 80 is set such that the scanning speed at the outermost off-axis image height is lower than the scanning speed at the on-axis image height.

Specifically, based on the expression (9) and the expression (15), dependence of the scanning speed dY/dθ on the angle of view θ in each of the related-art OFS light scanning apparatus and the light scanning apparatus 1 according to the first embodiment is shown in FIG. 2C.

As shown in FIG. 2C, it is found that, in the light scanning apparatus 1 according to the first embodiment, the scanning speed decreases by about 7.6% at the outermost off-axis image height as compared with the scanning speed at the on-axis image height.

In the light scanning apparatus 1 according to the first embodiment, the following conditional expression (17) be satisfied.

$$1.02 < \frac{\frac{dY(0)}{d\theta}}{\frac{dY(\theta_{max})}{d\theta}} < 1.20 \tag{17}$$

When the ratio falls below the lower limit value of the conditional expression (17), in order to achieve satisfactory imaging performance while suppressing a variation of the spot diameter at every image height on the scanned surface 50, it is required to secure, for example, about 240 mm as the distance between the deflecting surface 31 and the scanned surface 50. Consequently, it becomes difficult to achieve downsizing of the light scanning apparatus 1.

Meanwhile, when the ratio exceeds the upper limit value of the conditional expression (17), a variation of the spot diameter can be suppressed in a scanned region in which the angle of view is larger, but it becomes difficult to achieve satisfactory imaging performance owing to residual aberrations, such as a wavefront aberration and a partial magnification.

In the light scanning apparatus 1 according to the first embodiment, the following conditional expression (17a) be satisfied instead of the conditional expression (17).

$$1.05 < \frac{\frac{dY(0)}{d\theta}}{\frac{dY(\theta_{max})}{d\theta}} < 1.15 \tag{17a}$$

In the light scanning apparatus 1 according to the first embodiment, the scanned regions on the scanned surface 50 are set to be symmetrical to each other with respect to the optical axis, but the following case is now considered: the scanned regions are set to be asymmetrical to each other with respect to the optical axis, in other words, the positions of the outermost off-axis image height on the +Y side and the outermost off-axis image height on the −Y side are set to be asymmetrical to each other with respect to the on-axis image height.

In this case, the following conditional expressions (18) and (19) be satisfied instead of the conditional expression (17).

$$1.02 < \frac{\left(\frac{dY_a}{d\theta}\right)}{\left(\frac{dY_b}{d\theta}\right)} < 1.20 \tag{18}$$

$$1.02 < \frac{\left(\frac{dY_a}{d\theta}\right)}{\left(\frac{dY_c}{d\theta}\right)} < 1.20 \tag{19}$$

In the conditional expressions (18) and (19), $Y_a$, $Y_b$, and $Y=_c$ represent coordinates in the main scanning direction of the on-axis image height, the outermost off-axis image height on one side with respect to the optical axis, and the outermost off-axis image height on the other side in the scanned regions on the scanned surface 50, respectively.

Further, in this case, the following conditional expressions (18a) and (19a) be satisfied instead of the conditional expression (17a).

$$1.05 < \frac{\left(\frac{dY_a}{d\theta}\right)}{\left(\frac{dY_b}{d\theta}\right)} < 1.15 \tag{18a}$$

$$1.05 < \frac{\left(\frac{dY_a}{d\theta}\right)}{\left(\frac{dY_c}{d\theta}\right)} < 1.15 \tag{19a}$$

A value of a ratio of the scanning speed of the spot at the on-axis image height (angle of view: 0) with respect to the scanning speed of the spot at a predetermined off-axis image height (angle of view: 0) on the scanned surface 50 is represented by the following expression (20).

$$\frac{\frac{dY(0)}{d\theta}}{\frac{dY(\theta)}{d\theta}} = \frac{F}{F + \sum_{i=2} i\alpha_i \theta^{i-1}} \tag{20}$$

That is, it is found from the expression (20) that, in the light scanning apparatus 1 according to the first embodiment, the scanning speed becomes lower as the angle of view θ becomes larger from the on-axis image height toward the off-axis image height.

In other words, in the light scanning apparatus 1 according to the first embodiment, the scanning speed of the spot on the scanned surface 50 is largest at the on-axis image height, and monotonically decreases from the on-axis image height toward the off-axis image height.

Further, in the light scanning apparatus 1 according to the first embodiment, an absolute value (magnitude) of an amount of change in the scanning speed dY/dt per unit time monotonically increases from the on-axis image height toward the outermost off-axis image height.

This is because values of the second and subsequent terms in the denominator of the expression (20) each change in proportion to at least the square of the angle of view θ.

In other words, in the light scanning apparatus 1 according to the first embodiment, a scanning acceleration $d^2Y/dt^2$, which is an amount of change in the scanning speed dY/dt per unit time, is represented by the following expression (21) through use of the expression (12).

$$\frac{d^2Y}{dt^2}=\left(\frac{d}{d\theta}\right)\left(\frac{d\theta}{dt}\right)\left[\left(\frac{dY}{d\theta}\right)\left(\frac{d\theta}{dt}\right)\right]=\frac{d^2Y}{d\theta^2}=\sum\nolimits_{i=2} i(i-1)\alpha_i\theta^{i-2} \tag{21}$$

In the light scanning apparatus 1 according to the first embodiment, $\alpha_3=-5.87$ and $\alpha_i=0$ (where $i\neq 3$) as shown in Table 1, and hence the absolute value (magnitude) of the scanning acceleration $d^2Y/d\theta^2$ monotonically increases from the on-axis image height toward the outermost off-axis image height.

Further, focal lengths of the imaging optical system 80 at the on-axis position (angle of view: 0) and at a predetermined position in the main scanning direction (angle of view: θ) are represented by f(0) and f(θ), respectively.

In this case, a value df(θ) of a ratio of f(θ) to f(0) is represented by the following expression (22).

$$\frac{f(\theta)}{f(0)}=df(\theta)=A\times\frac{\left[\frac{dY(\theta)}{d\theta}\right]}{\left[\frac{dY(0)}{d\theta}\right]} \tag{22}$$

In the expression (22), A is a constant.

Accordingly, the focal length f(0) of the imaging optical system 80 at the predetermined position in the main scanning direction can be represented by the following expression (23) from the expression (15) and the expression (22).

$$f(\theta)=f(0)\times df(\theta)=F\times\left\{A\times\frac{\left[\frac{dY(\theta)}{d\theta}\right]}{\left[\frac{dY(0)}{d\theta}\right]}\right\}=A\times\left(F+\sum\nolimits_{i=2} i\alpha_i\theta^{i-1}\right) \tag{23}$$

In the derivation of the expression (23), the fact that the Fθ coefficient F is equal to the focal length f(0) of the imaging optical system 80 at the on-axis position as described above is used.

As shown in the expression (23), in the light scanning apparatus 1 according to the first embodiment, as the angle of view θ increases from the on-axis image height toward the outermost off-axis image height, the refractive power of the imaging optical system 80 in the main scanning cross section increases, that is, the focal length f(0) in the main scanning cross section becomes shorter.

As described above, in the light scanning apparatus 1 according to the first embodiment, not only the light flux width W in the main scanning direction of the light flux entering each position of the imaging optical system 80 in the main scanning direction, but also the focal length "f" of the imaging optical system 80 in the main scanning cross section depends on the angle of view θ.

That is, the expressions (6) and (11) can be rewritten as the following expressions (24) and (25), respectively.

$$\text{SPOT }(\theta)=\frac{K\times\lambda\times f(\theta)}{W(\theta)} \tag{24}$$

$$dSPOT(\theta)=\frac{df(\theta)}{dW(\theta)} \tag{25}$$

Now, assuming that the light flux width W does not change at each angle of view, that is, dW(O) is 1, the ratio dSPOT(O) of the spot diameter at each angle of view depends on the ratio df(O) of the focal length at each angle of view in accordance with the expression (25).

Further, based on the expression (25), dependence of the ratio dSPOT of the spot diameter on the angle of view θ given when dW(θ) is set to 1 is indicated by the dotted line of FIG. 2A.

Still further, based on the expression (25), dependence of the ratio dSPOT of the spot diameter on the angle of view θ given when dW(θ) and df(θ) both change is indicated by the solid line of FIG. 2A.

As shown in FIG. 2A, it is found that the change (broken line) in the ratio dSPOT(θ) of the spot diameter given when the ratio dW(θ) of the light flux width changes and the change (dotted line) in the ratio dSPOT(θ) of the spot diameter given when the ratio df(θ) of the focal length changes cancel out each other.

That is, as indicated by the solid line of FIG. 2A, it is found that, in the light scanning apparatus 1 according to the first embodiment, the ratio dSPOT(θ) of the spot diameter is substantially constant at every angle of view between the on-axis image height and the outermost off-axis image height.

Further, the spot diameter SPOT(θ) at each angle of view can be represented by the following expression (26) from the expression (5), the expression (23), and the expression (24).

$$\text{SPOT }(\theta)=\frac{K\times\lambda\times f(\theta)}{W(\theta)}=\frac{K\times\lambda\times F\times\left\{A\times\frac{\left[\frac{dY(\theta)}{d\theta}\right]}{\left[\frac{dY(0)}{d\theta}\right]}\right\}}{W_0\cos\left(\frac{\theta}{2}\right)} \tag{26}$$

When the following expression (27) is satisfied, the spot diameters SPOT(θ) at respective angles of view on the scanned surface 50 are equal to each other.

$$\frac{\frac{dY(\theta)}{d\theta}}{\cos\left(\frac{\theta}{2}\right)}=\text{constant} \tag{27}$$

Further, in the light scanning apparatus 1 according to the first embodiment, the imaging optical system 80 be set such that the following conditional expression (28) is satisfied.

$$0.95<\frac{\left[\frac{dY(0)}{d\theta}\right]}{\left[\frac{dY(\theta_{max})}{d\theta}\right]}\times\cos\left(\frac{\theta_{max}}{2}\right)<1.05 \tag{28}$$

When the conditional expression (28) is satisfied, the spot diameter SPOT(θ) at each angle of view on the scanned surface 50 falls within a predetermined range.

It is described above that the spot diameters SPOT(θ) at respective angles of view on the scanned surface 50 are equal to each other when the expression (27) is satisfied, but in actual cases, residual aberrations, such as a wavefront aberration and a partial magnification, influence the spot at each image height on the scanned surface 50.

Accordingly, in the light scanning apparatus 1 according to the first embodiment, when the conditional expression (28) is satisfied instead of the expression (27), the spot diameter SPOT(θ) at each angle of view on the scanned surface 50 falls within the predetermined range.

Further, in the light scanning apparatus 1 according to the first embodiment, in order to further suppress a variation of the spot diameter, the imaging optical system 80 be set such that the following conditional expression (28a) is satisfied instead of the conditional expression (28).

$$0.965 < \frac{\left[\frac{dY(0)}{d\theta}\right]}{\left[\frac{dY(\theta_{max})}{d\theta}\right]} \times \cos\left(\frac{\theta_{max}}{2}\right) < 1.035 \tag{28a}$$

When the conditional expression (28a) is satisfied, a rate of variation in the spot diameter in the light scanning apparatus 1 according to the first embodiment can be suppressed to 3.5%, which is a typical rate of variation in the spot diameter in the related-art light scanning apparatus employing the UFS system, or less.

In the light scanning apparatus 1 according to the first embodiment, the scanned regions on the scanned surface 50 are set to be symmetrical to each other with respect to the optical axis, but the following case is now considered: the scanned regions are set to be asymmetrical to each other with respect to the optical axis, in other words, the positions of the outermost off-axis image height on the +Y side and at the outermost off-axis image height on the −Y side are set to be asymmetrical to each other with respect to the on-axis image height.

In this case, the following conditional expressions (29) and (30) be satisfied instead of the conditional expression (28).

$$0.95 < \frac{\left[\frac{dY_a}{d\theta}\right]}{\left[\frac{dY_b}{d\theta}\right]} \times \cos\left(\frac{\theta_b}{2}\right) < 1.05 \tag{29}$$

$$0.95 < \frac{\left[\frac{dY_a}{d\theta}\right]}{\left[\frac{dY_c}{d\theta}\right]} \times \cos\left(\frac{\theta_c}{2}\right) < 1.05 \tag{30}$$

In the conditional expressions (29) and (30), $Y_a$, $Y_b$, and $Y_c$ represent the coordinates in the main scanning direction of the on-axis image height, the outermost off-axis image height on the one side with respect to the optical axis, and the outermost off-axis image height on the other side in the scanned regions on the scanned surface 50, respectively.

Further, $\theta_b$ and $\theta_c$ represent the angles of view corresponding to the outermost off-axis image height $Y_b$ on the one side and the outermost off-axis image height $Y_c$ on the other side, respectively.

Further, in this case, the following conditional expressions (29a) and (30a) be satisfied instead of the conditional expression (28a).

$$0.965 < \frac{\left[\frac{dY_a}{d\theta}\right]}{\left[\frac{dY_b}{d\theta}\right]} \times \cos\left(\frac{\theta_b}{2}\right) < 1.035 \tag{29a}$$

$$0.965 < \frac{\left[\frac{dY_a}{d\theta}\right]}{\left[\frac{dY_c}{d\theta}\right]} \times \cos\left(\frac{\theta_c}{2}\right) < 1.035 \tag{29b}$$

Further, based on the expression (26), dependence of the spot diameter SPOT on the scanned surface 50 on the angle of view θ in the light scanning apparatus 1 according to the first embodiment is shown in FIG. 2D.

As shown in FIG. 2D, the minimum spot diameter and the maximum spot diameter among the spot diameters at all the image heights are 69.6 micrometers and 71.9 micrometers, respectively.

That is, a rate of variation of the spot diameter SPOT on the scanned surface 50 in the light scanning apparatus 1 according to the first embodiment is (71.9−69.6)/69.6=3.3%.

The spot diameter on the scanned surface 50 varies in accordance with the image height in this manner because residual aberrations, such as a wavefront aberration and a partial magnification, influence the spot at each image height on the scanned surface 50.

Further, regarding an amount of light at each image height on the scanned surface 50 in the light scanning apparatus 1 according to the first embodiment, df(θ)/dW(θ) shown in the expression (25) is equivalent to an F-number at the angle of view θ.

That is, in the light scanning apparatus 1 according to the first embodiment, by causing the change in the ratio dW(θ) of the light flux width and the change in the ratio df(θ) of the focal length to cancel out each other as described above, it is also possible to suppress a change in the F-number of the spot scanning on the scanned surface 50.

As a result, by also suppressing a change in the amount of light at each image height on the scanned surface 50, it is possible to reduce a non-uniformity in an image surface illuminance distribution.

Further, in the light scanning apparatus 1 according to the first embodiment, regarding the angle of view $\theta_{max}$ of the light flux entering the outermost off-axis image height on the scanned surface 50, the following conditional expression (31) be satisfied.

$$0.225\pi < |\theta_{max}| < 0.300\pi \tag{31}$$

The conditional expression (31) indicates a range of values of the maximum angle of view that may be taken when the polygon mirror having six to eight surfaces is used as the deflecting unit 30.

Further, in the light scanning apparatus 1 according to the first embodiment, even when an angle-of-view region on the +Y side and an angle-of-view region on the −Y side with respect to the optical axis of the imaging optical system 80 are set to have sizes equivalent to each other as described above, a change in dSPOT(θ) given when dW(θ) changes and a change in dSPOT(θ) given when df(θ) changes are caused to cancel out each other.

That is, the imaging optical system 80 is set such that the conditional expression (31) is satisfied.

As a result, by making the distance between the deflecting surface 31 of the deflecting unit 30 and the scanned surface 50 greatly smaller than that in the related-art OFS light scanning apparatus, it is possible to achieve downsizing of the light scanning apparatus 1 according to the first embodiment.

Specifically, in the light scanning apparatus 1 according to the first embodiment, the distance between the deflecting surface 31 of the deflecting unit 30 and the scanned surface 50 is about 170 mm as shown in Table 1.

Further, in the light scanning apparatus 1 according to the first embodiment, as described above, the light flux that has passed through the incident optical system 20 is obliquely incident on each deflecting surface 31 of the deflecting unit 30 at the predetermined angle in the sub-scanning cross section.

In addition, the traveling direction of the principal ray of the light flux that has passed through the incident optical system 20 is substantially parallel to the optical axis of the imaging optical system 80 when the principal ray is projected onto the main scanning cross section.

As a result, the shape in the main scanning cross section of the imaging optical system 80, that is, the imaging lens 40, can be designed to be symmetrical with respect to the optical axis, and hence imaging performance in the main scanning cross section at each image height on the scanned surface 50 can be designed more satisfactorily.

As described above, in the light scanning apparatus 1 according to the first embodiment, it is possible to reduce a variation of the spot diameter and a non-uniformity in the image surface illuminance distribution on the scanned surface 50 which occur in the OFS system employed in order to achieve high-speed and high-definition printing in the image forming apparatus to which the light scanning apparatus 1 is mounted.

In the light scanning apparatus 1 according to the first embodiment, it is also possible to sufficiently secure the scanned region on the scanned surface 50 by setting the imaging optical system 80 as described above.

In addition, in the light scanning apparatus 1 according to the first embodiment, it is possible to achieve downsizing by making the distance between the deflecting surface 31 of the deflecting unit 30 and the scanned surface 50 greatly smaller than that in the related-art OFS light scanning apparatus.

In the light scanning apparatus 1 according to the first embodiment, the anamorphic lens is used as the coupling lens 22, but instead, a rotationally symmetrical coupling lens and a cylindrical lens having a refractive power only in the sub-scanning cross section may be used.

Further, in the light scanning apparatus 1 according to the first embodiment, a reflective member such as a mirror may be provided in the middle of an optical path in order to avoid integration of optical members or physical interference between optical members.

Second Embodiment

Figure 3A:
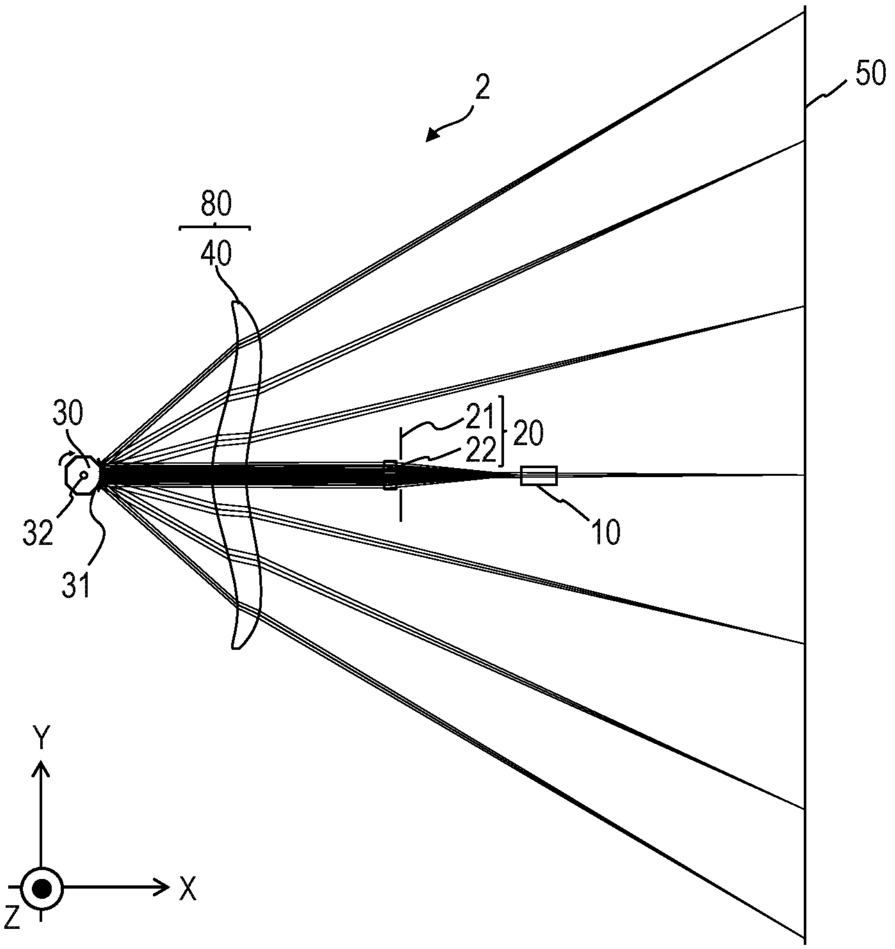
FIG. 3A is a main scanning cross-sectional view of a light scanning apparatus according to a second embodiment of the disclosure.
Figure 3B:
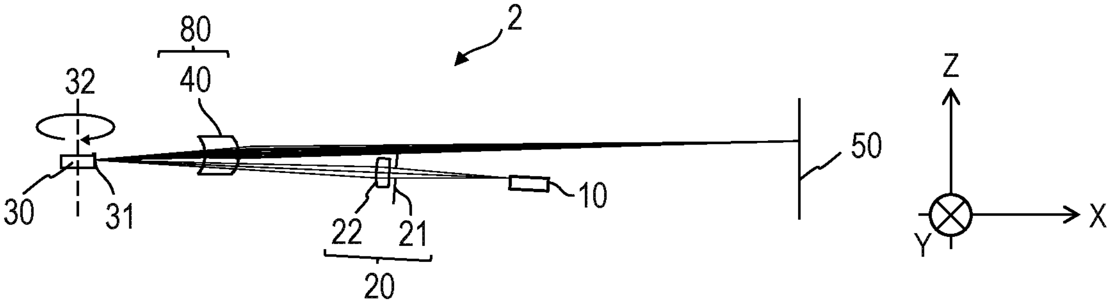
FIG. 3B is a sub-scanning cross-sectional view of the light scanning apparatus according to the second embodiment.

FIG. 3A and FIG. 3B are a main scanning cross-sectional view and a sub-scanning cross-sectional view, respectively, of a light scanning apparatus 2 according to a second embodiment of the disclosure.

The light scanning apparatus 2 according to the second embodiment has the same configuration as that of the light scanning apparatus 1 according to the first embodiment, and hence the same members are denoted by the same reference numerals and description thereof is omitted.

Further, various specification values of the light scanning apparatus 2 according to the second embodiment are shown in Table 3 and Table 4 given below.

TABLE 3

| Characteristic of light source 10 | | | | Arrangement | | |
|---|---|---|---|---|---|---|
| Wavelength | λ(nm) | | 790 | Light source 10 to aperture stop 21 | d11 (mm) | 26.75 |
| Incident optical system 20 | | | | | | |
| Angle formed by optical axis of incident optical system 20 with respect to optical axis of imaging optical system 80 | Main scanning cross section | θi1 (rad) | 0.000 | Aperture stop 21 to incident surface of coupling lens 22 | d21 (mm) | 1.00 |
| | Sub-scanning cross section | θi2 (rad) | 0.044 | Incident surface of coupling lens 22 to exit surface of coupling lens 22 | d22 (mm) | 3.00 |
| Aperture stop 21 | Main scanning cross section | p1 (mm) | 14.00 | | | |
| | Sub-scanning cross section | p2 (mm) | 2.40 | Exit surface of coupling lens 22 to deflecting surface 31 of deflecting unit 30 | d23 (mm) | 62.00 |
| Refractive index | | | | | | |
| Coupling lens 22 | N2 | | 1.531 (λ = 790 nm) | Deflecting surface unit 30 to incident 31 of deflecting surface of imaging lens 40 | d41 (mm) | 25.40 |
| Imaging lens 40 | N4 | | 1.531 (λ = 790 nm) | | | |
| Deflecting unit 30 | | | | | | |
| Number of deflecting surfaces 31 | N | | 8 | Incident surface of imaging lens 40 to exit surface of imaging lens 40 | d42 (mm) | 7.83 |

TABLE 3-continued

| | | | | | |
|---|---|---|---|---|---|
| Circumdiameter | φ (mm) | 15.0 | Exit surface of imaging lens 40 to scanned surface 50 | d43 (mm) | 129.06 |
| Rotation angle from Y0 to Ymax | θpmax (rad) | 0.365 | | | |
| Width of deflecting surface 31 — Main scanning cross section | a1 (mm) | 2.44 | | | |
| Width of deflecting surface 31 — Sub-scanning cross section | a2 (mm) | 2.00 | | | |
| Distance from rotational axis 32 to deflecting surface 31 | d0 (mm) | 6.93 | | | |
| Imaging optical system 80 | | | | | |
| Fθ coefficient | | 150 | | | |
| DIST coefficient | α3 | −6.19 | | | |
| | other than α3 | 0 | | | |
| Outermost off-axis image height | Ymax (mm) | ±107 | | | |
| Angle of view of light beam traveling toward Ymax | θmax (rad) | 0.730 | | | |

TABLE 4

| Meridional line shape of coupling lens 22 | | | Meridional line shape of imaging lens 40 | | | Meridional line shape of imaging lens 40 | | |
|---|---|---|---|---|---|---|---|---|
| | Incident surface | Exit surface | | Incident surface | Exit surface | | Incident surface | Exit surface |
| | +Y side | | | +Y side | | | +Y side | |
| R | 0.000 | 15.925 | R | 59.177 | 285.146 | M01u | 1.81E−02 | 6.55E−03 |
| KYu | 0.000E+00 | 5.109E+00 | KYu | −9.234E+00 | 2.001E+01 | M21u | −2.69E−05 | −1.45E−05 |
| B2u | 0.000E+00 | 0.000E+00 | B2u | 0.000E+00 | 0.000E+00 | M41u | −3.95E−08 | −2.57E−10 |
| B4u | 0.000E+00 | −1.463E−04 | B4u | −6.889E−06 | −7.196E−06 | M61u | −4.42E−11 | −7.96E−11 |
| B6u | 0.000E+00 | −4.104E−06 | B6u | 9.410E−09 | 4.956E−09 | M81u | 0 | 1.47E−14 |
| B8u | 0.000E+00 | 0.000E+00 | B8u | −7.414E−12 | −1.783E−12 | | −Y side | |
| B10u | 0.000E+00 | 0.000E+00 | B10u | −3.461E−19 | −2.397E−16 | M01l | 1.81.E−02 | 6.55E−03 |
| B12u | 0.000E+00 | 0.000E+00 | B12u | 0.000E+00 | 0.000E+00 | M21l | −2.69E−05 | −1.45E−05 |
| | −Y side | | | −Y side | | M41l | −3.95E−08 | −2.57E−10 |
| KYl | 0.000E+00 | 5.109E+00 | KYl | −9.234E+00 | 2.001E+01 | M61l | −4.42E−11 | −7.96E−11 |
| B2l | 0.000E+00 | 0.000E+00 | B2l | 0.000E+00 | 0.000E+00 | M81l | 0 | 1.47E−14 |
| B4l | 0.000E+00 | −1.463E−04 | B4l | −6.889E−06 | −7.196E−06 | | | |
| B6l | 0.000E+00 | −4.104E−06 | B6l | 9.410E−09 | 4.956E−09 | | | |
| B8l | 0.000E+00 | 0.000E+00 | B8l | −7.414E−12 | −1.783E−12 | | | |
| B10l | 0.000E+00 | 0.000E+00 | B10l | 2.620E−15 | −2.397E−16 | | | |
| B12l | 0.000E+00 | 0.000E+00 | B12l | −3.461E−19 | 8.208E−20 | | | |

| Sagittal line shape of coupling lens 22 | | | Sagittal line shape of imaging lens 40 | | |
|---|---|---|---|---|---|
| | Incident surface | Exit surface | | Incident surface | Exit surface |
| | +Y side | | | +Y side | |
| KZu | 0.000E+00 | −9.704E−01 | KZu | 0.000E+00 | 0.000E+00 |
| | −Y side | | | −Y side | |
| KZl | 0.000E+00 | −9.704E−01 | KZl | 0.000E+00 | 0.000E+00 |
| | Change in sagittal line R | Change in sagittal line R | | Change in sagittal line R | Change in sagittal line R |
| | +Y side | | | +Y side | |
| r | 0.000 | 10.844 | r | −16.309 | −9.745 |
| E2u | 0.000E+00 | 0.000E+00 | E2u | 4.738E−03 | 1.176E−03 |
| E4u | 0.000E+00 | 2.959E−04 | E4u | 1.767E−06 | −1.285E−06 |
| E6u | 0.000E+00 | −1.625E−05 | E6u | 4.570E−09 | 1.820E−09 |
| E8u | 0.000E+00 | 0.000E+00 | E8u | 1.368E−12 | −1.430E−12 |
| E10u | 0.000E+00 | 0.000E+00 | E10u | −8.180E−17 | 4.242E−16 |
| | −Y side | | | −Y side | |
| E2l | 0.000E+00 | 0.000E+00 | E2l | 4.738E−03 | 1.176E−03 |
| E4l | 0.000E+00 | 2.959E−04 | E4l | 1.767E−06 | −1.285E−06 |

TABLE 4-continued

| Meridional line shape of coupling lens 22 | | | Meridional line shape of imaging lens 40 | | | Meridional line shape of imaging lens 40 | |
|---|---|---|---|---|---|---|---|
| | Incident surface | Exit surface | | Incident surface | Exit surface | Incident surface | Exit surface |
| E6l | 0.000E+00 | −1.625E−05 | E6l | 4.570E−09 | 1.820E−09 | | |
| E8l | 0.000E+00 | 0.000E+00 | E8l | 1.368E−12 | −1.430E−12 | | |
| E10l | 0.000E+00 | 0.000E+00 | E10l | 4.242E−16 | 4.242E−16 | | |

Definitions of a local coordinate system and a shape of each optical surface are the same as those of the light scanning apparatus 1 according to the first embodiment.

Figure 4A:
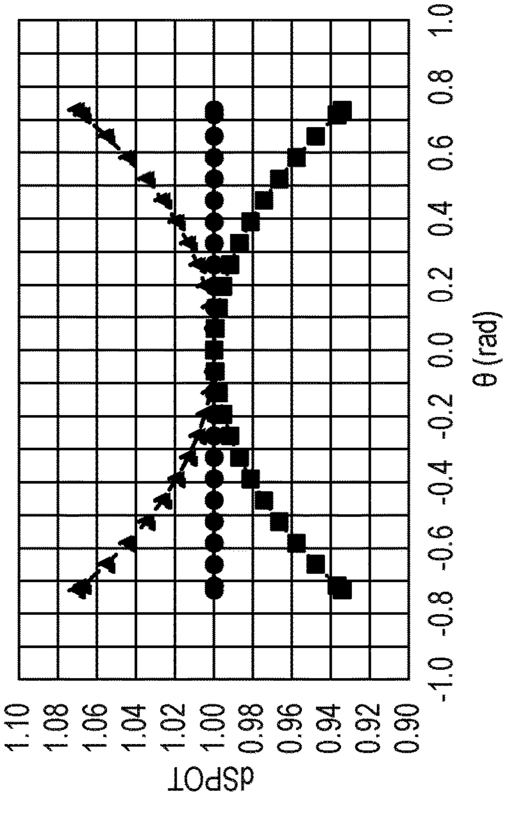
FIG. 4A is a graph for showing a change in a ratio of a spot diameter in the light scanning apparatus according to the second embodiment.

FIG. 4A shows dependence of the ratio dSPOT of the spot diameter in the main scanning direction on the scanned surface 50 on the angle of view θ in the light scanning apparatus 2 according to the second embodiment.

Specifically, based on the expression (11), a change in the ratio dSPOT(θ) of the spot diameter in the main scanning direction on the scanned surface 50 given when the ratio dW(θ) of the light flux width in the main scanning direction of the light flux entering the imaging optical system 80 changes is indicated by the broken line of FIG. 4A.

As shown in FIG. 4A, a width of variation of dSPOT(θ) given when dW(θ) changes is about 7% over the entire range of the angle of view θ, and it is found that a variation of the light flux width W causes a variation of the spot diameter SPOT in the main scanning direction.

Further, in the light scanning apparatus 2 according to the second embodiment, in the same manner as in the light scanning apparatus 1 according to the first embodiment, the scanning speed on the scanned surface 50 is decreased as the angle of view θ increases from the on-axis image height toward the outermost off-axis image height.

In addition, in the light scanning apparatus 2 according to the second embodiment, in the same manner as in the light scanning apparatus 1 according to the first embodiment, as the angle of view θ increases from the on-axis image height toward the outermost off-axis image height, the power of the imaging optical system 80 in the main scanning cross section increases, that is, the focal length in the main scanning cross section is shortened.

Further, based on the expression (25), dependence of the ratio dSPOT of the spot diameter on the angle of view θ given when the light flux width does not change at each angle of view, that is, dW(θ) is set to 1, is indicated by the dotted line of FIG. 4A.

Still further, based on the expression (25), dependence of dSPOT on the angle of view θ given when dW(θ) and df(θ) both change is indicated by the solid line of FIG. 4A.

As shown in FIG. 4A, it is found that the change in the ratio dSPOT(θ) of the spot diameter given when the ratio dW(θ) of the light flux width changes and the change in the ratio dSPOT(θ) of the spot diameter given when the ratio df(θ) of the focal length changes cancel out each other.

Specifically, it is found that the width of variation of the ratio dSPOT(θ) of the spot diameter, which is about 7% over the entire range of the angle of view θ as a result of the change in the ratio dW(θ) of the light flux width, can be reduced to nearly 0% by changing the ratio df(θ) of the focal length.

That is, in the related-art OFS light scanning apparatus, the ratio dSPOT(θ) of the spot diameter changes by about 7% over the entire range of the angle of view θ, but in the light scanning apparatus 2 according to the second embodiment, the change in the ratio dSPOT(θ) of the spot diameter can be reduced to nearly 0% over the entire range of the angle of view θ.

Further, in the light scanning apparatus 2 according to the second embodiment, the conditional expressions (28) and (28a) are satisfied.

Figure 4B:
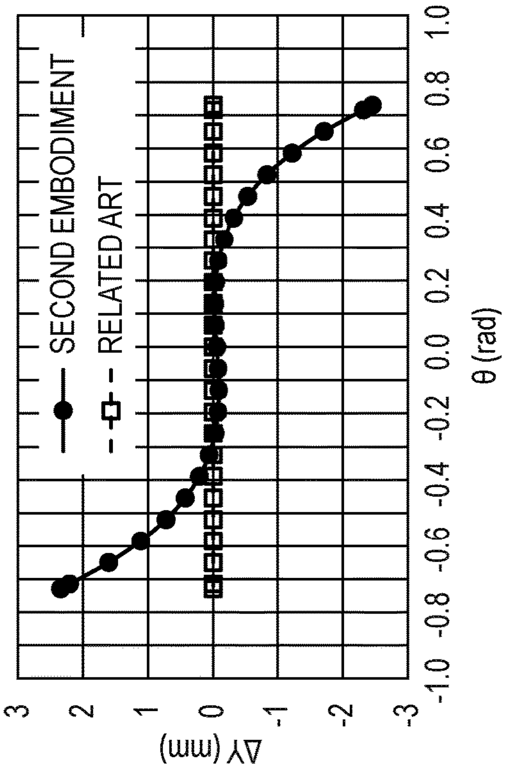
FIG. 4B is a graph for showing a DIST characteristic in the light scanning apparatus according to the second embodiment.

Further, based on each of the expression (8) and the expression (12), dependence of the image height Y on the angle of view θ in each of the related-art OFS light scanning apparatus and the light scanning apparatus 2 according to the second embodiment is shown in FIG. 4B.

In FIG. 4B, an amount of difference ΔY from the image height in the related-art OFS light scanning apparatus is shown.

As shown in FIG. 4B, in the light scanning apparatus 2 according to the second embodiment, the imaging optical system 80 having the DIST characteristic in which the position of the outermost off-axis image height is moved by about 2.5 mm toward the on-axis image height side as compared with the related-art OFS light scanning apparatus is set.

Figure 4C:
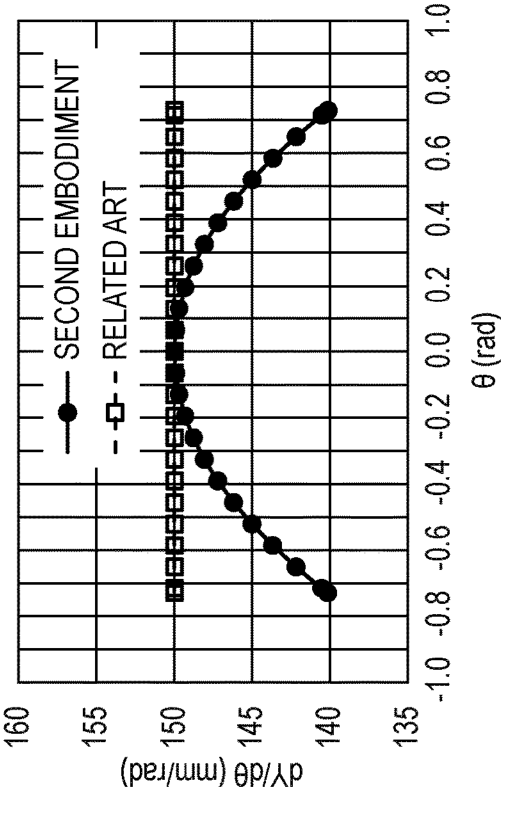
FIG. 4C is a graph for showing a change in a spot movement speed in the light scanning apparatus according to the second embodiment.

Further, based on the expression (9) and the expression (15), dependence of the scanning speed dY/dθ on the angle of view θ in each of the related-art OFS light scanning apparatus and the light scanning apparatus 2 according to the second embodiment is shown in FIG. 4C.

As shown in FIG. 4C, it is found that, in the light scanning apparatus 2 according to the second embodiment, the scanning speed dY/dθ decreases by 6.8% at the outermost off-axis image height as compared with the scanning speed at the on-axis image height.

Further, in the light scanning apparatus 2 according to the second embodiment, each DIST coefficient $\alpha_i$ of the imaging optical system 80 is set such that the DIST characteristic in which the absolute value of the amount of change in the scanning speed dY/dθ gradually increases as the angle of view θ increases is achieved.

That is, while the scanning speed dY/dθ is a constant value F regardless of the angle of view θ in the related-art OFS light scanning apparatus, the scanning speed dY/dθ monotonically decreases as the angle of view θ increases in the light scanning apparatus 2 according to the second embodiment.

In addition, the absolute value of the amount of change in the scanning speed dY/dθ in accordance with the change in the angle of view θ monotonically increases as the angle of view θ increases.

Figure 4D:
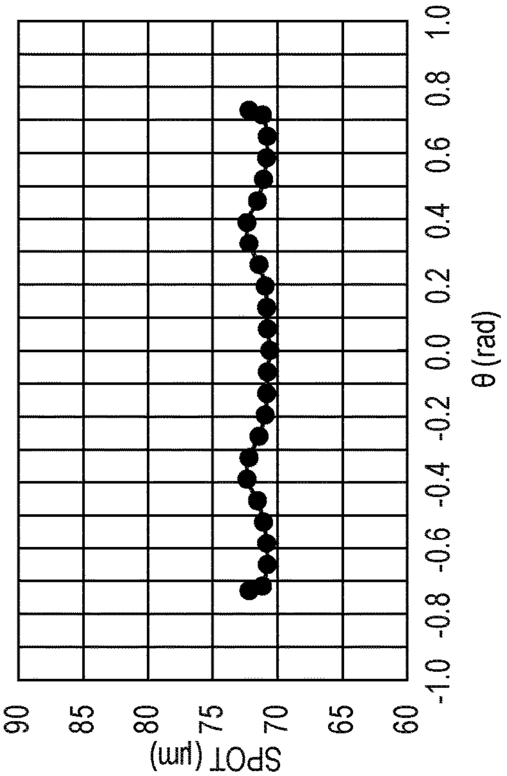
FIG. 4D is a graph for showing a change in a spot diameter in the light scanning apparatus according to the second embodiment.

Further, based on the expression (26), dependence of the spot diameter SPOT on the scanned surface 50 on the angle of view θ in the light scanning apparatus 2 according to the second embodiment is shown in FIG. 4D.

As shown in FIG. 4D, in the light scanning apparatus 2 according to the second embodiment, the minimum spot diameter and the maximum spot diameter among the spot diameters at the respective image heights on the scanned surface 50 are 70.6 micrometers and 72.3 micrometers, respectively.

That is, a rate of variation of the spot diameter over all the image heights on the scanned surface 50 in the light scanning apparatus 2 according to the second embodiment is 2.5%, and the rate of variation is thus further reduced than in the light scanning apparatus 1 according to the first embodiment.

The spot diameter varies on the scanned surface 50 because residual aberrations, such as a wavefront aberration and a partial magnification, influence the spot at each image height on the scanned surface 50.

Further, in the light scanning apparatus 2 according to the second embodiment, the distance between the deflecting surface 31 and the scanned surface 50 is 162 mm, which is greatly smaller than that in the related-art OFS light scanning apparatus, and is further reduced than in the light scanning apparatus 1 according to the first embodiment.

As described above, in the light scanning apparatus 2 according to the second embodiment, it is possible to further reduce a variation of the spot diameter and a non-uniformity in the image surface illuminance distribution which occur in the OFS system employed in order to achieve high-speed and high-definition printing in the image forming apparatus to which the light scanning apparatus 2 is mounted.

In the light scanning apparatus 2 according to the second embodiment, it is also possible to sufficiently secure the scanned region on the scanned surface 50 by setting the imaging optical system 80 as described above.

In addition, in the light scanning apparatus 2 according to the second embodiment, it is possible to achieve downsizing by further greatly reducing the distance between the deflecting surface 31 and the scanned surface 50.

According to the disclosure, it is possible to provide the light scanning apparatus with which variations in the spot diameter and the illuminance can be suppressed while a sufficient scanned region is secured.

The exemplary embodiments of the disclosure are described above, but the disclosure is not limited to those embodiments and can be modified and changed variously within the scope of the gist thereof.

[Image Forming Apparatus]

Figure 5:
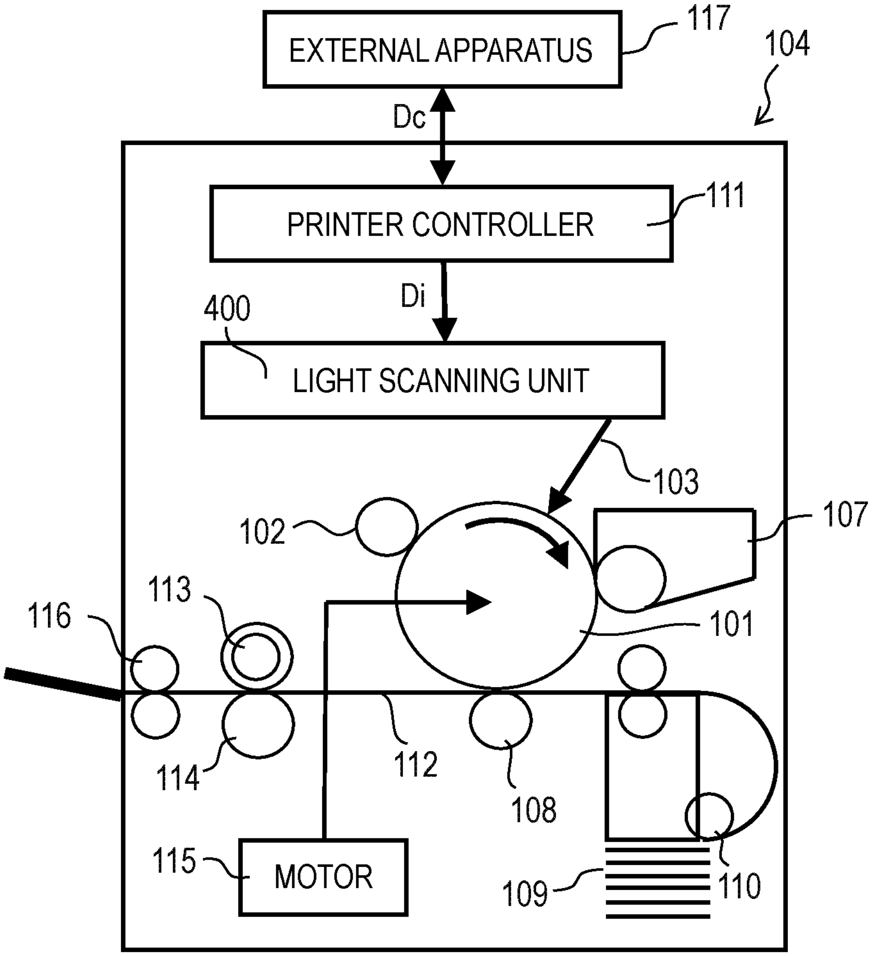
FIG. 5 is a main-part sub-scanning cross-sectional view of an image forming apparatus according to the disclosure.

FIG. 5 is a main-part sub-scanning cross-sectional view of an image forming apparatus (electrophotographic printer) 104 including the light scanning apparatus according to any one of the first and second embodiments.

As illustrated in FIG. 5, code data Dc is input from an external apparatus 117 such as a personal computer to the image forming apparatus 104.

Then, the code data Dc, which is a signal output from the external apparatus 117, is converted into image data (dot data) Di by a printer controller 111 in the image forming apparatus 104.

Subsequently, the image data Di obtained by the conversion is input to a light scanning unit 400, which is the light scanning apparatus according to any one of the first and second embodiments.

Then, a light beam (light flux) 103 modulated in accordance with the input image data Di is emitted from the light scanning unit 400, and this light beam 103 scans on a photosensitive surface of a photosensitive drum 101 in the main scanning direction.

Further, the photosensitive drum 101 serving as an electrostatic latent image bearing member (photosensitive member) is rotated clockwise in FIG. 5 by a motor 115.

Then, along with this rotation, the photosensitive surface of the photosensitive drum 101 is moved with respect to the light beam 103 in the sub-scanning direction orthogonal to the main scanning direction.

Further, on the upper side of the photosensitive drum 101, a charging roller 102 which uniformly charges the surface of the photosensitive drum 101 is provided in abutment against the surface of the photosensitive drum 101.

Further, the light beam 103 scanned by the light scanning unit 400 is radiated to the surface of the photosensitive drum 101 charged by the charging roller 102.

As described above, the light beam 103 is modulated based on the image data Di, and this light beam 103 is radiated to form an electrostatic latent image on the surface of the photosensitive drum 101.

Then, the formed electrostatic latent image is developed as a toner image by a developing unit 107 arranged so as to abut against the photosensitive drum 101 on the downstream side in a rotating cross section of the photosensitive drum 101 with respect to the position at which the light beam 103 is radiated.

Subsequently, the toner image developed by the developing unit 107 is transferred onto a sheet 112 serving as a transferred material by a transferring roller (transferring unit) 108 arranged on the lower side of the photosensitive drum 101 so as to oppose the photosensitive drum 101.

The sheet 112 is stored in a sheet cassette 109 arranged on the front side (right side of FIG. 5) of the photosensitive drum 101, but a sheet can also be fed manually.

Then, a sheet feeding roller 110 arranged at the end portion of the sheet cassette 109 sends the sheet 112 in the sheet cassette 109 to a conveyance path.

The sheet 112 having an unfixed toner image transferred thereonto as described above is further conveyed to a fixing unit arranged on the rear side (left side of FIG. 5) of the photosensitive drum 101.

The fixing unit includes a fixing roller 113 and a pressure roller 114. The fixing roller 113 includes a fixing heater (not shown) therein. The pressure roller 114 is arranged in pressure-contact with the fixing roller 113.

Then, heat and pressure are applied to the sheet 112 conveyed from the transferring roller 108 at a pressure-contact portion between the fixing roller 113 and the pressure roller 114 so that the unfixed toner image on the sheet 112 is fixed.

Further, sheet discharge rollers 116 are arranged on the rear side of the fixing unit, and the sheet 112 subjected to the fixing is discharged to the outside of the image forming apparatus 104 by the sheet discharge rollers 116.

Although not shown in FIG. 5, the printer controller 111 performs not only the above-mentioned data conversion but also control of members in the image forming apparatus 104 such as the motor 115, and control of members in the light scanning unit 400 such as a polygon motor.

In the above, the case in which the light scanning apparatus according to any one of the first and second embodiments is applied to the image forming apparatus 104 which performs monotone printing has been described, but it should be understood that the light scanning apparatus according to any one of the first and second embodiments can also be applied to a color image forming apparatus in which a plurality of light beams scan on a plurality of photosensitive members to draw images.

Specifically, for example, in a color image forming apparatus in which images of four colors are superimposed, it is sufficient to arrange four light scanning apparatus according to any one of the first and second embodiments in parallel.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-015789, filed Feb. 6, 2023, which is hereby incorporated by reference herein in its entirety.

What is claimed is:

1. An apparatus comprising:

a deflecting unit configured to deflect a light flux from a light source to scan a surface in a main scanning direction while rotating at a constant angular velocity; and an optical system configured to guide the deflected light flux onto the scanned surface, wherein, in a main scanning cross section including an optical axis of the optical system, a width of the light flux on a deflecting surface of the deflecting unit is larger than a width of the deflecting surface, wherein a scanning speed of the light flux on the scanned surface is highest at an on-axis image height, and wherein an absolute value of a scanning acceleration of the light flux on the scanned surface increases monotonically from the on-axis image height toward an outermost off-axis image height.

2. The apparatus according to claim 1, wherein, when an angle formed by a traveling direction of a principal ray of the light flux traveling toward a predetermined image height when the light flux is deflected by the deflecting unit with respect to the optical axis of the optical system is represented by $\theta$, the predetermined image height is represented by Y, and an F$\theta$ coefficient and a DIST coefficient of degree "i" of the optical system are represented by F and $\alpha_i$, respectively, and the following expression is satisfied:

$$Y = F\theta + \sum_{i=2}\alpha_i\theta^i,$$

the following conditions are satisfied:

$$\alpha_{2j} = 0; \text{ and}$$

$$\alpha_{2j+1} \leq 0,$$

and at least one of $\alpha_{2j+1}$ has a negative value, where "j" represents an integer of 1 or more.

3. The apparatus according to claim 2, wherein the following conditions are satisfied:

$$\alpha_3 < 0; \text{ and}$$

$$\alpha_{2k+1} = 0,$$

where "k" represents an integer of 2 or more.

4. The apparatus according to claim 1, wherein the following conditions are satisfied:

$$1.02 \leq \frac{\left(\frac{dY_a}{d\theta}\right)}{\left(\frac{dY_b}{d\theta}\right)} \leq 1.20; \text{ and}$$

$$1.02 \leq \frac{\left(\frac{dY_a}{d\theta}\right)}{\left(\frac{dY_c}{d\theta}\right)} \leq 1.20,$$

where $Y_a$, $Y_b$, and $Y_c$ represent coordinates in the main scanning direction of the on-axis image height, the outermost off-axis image height on one side, and the outermost off-axis image height on another side, respectively, and $\theta$ represents an angle formed by a traveling direction of a principal ray of the light flux traveling toward a predetermined image height when the light flux is deflected by the deflecting unit with respect to the optical axis of the optical system.

5. The apparatus according to claim 1, wherein the following conditions are satisfied:

$$0.95 \leq \frac{\left(\frac{dY_a}{d\theta}\right)}{\left(\frac{dY_b}{d\theta}\right)} \times \cos\left(\frac{\theta_b}{2}\right) \leq 1.05; \text{ and}$$

$$0.95 \leq \frac{\left(\frac{dY_a}{d\theta}\right)}{\left(\frac{dY_c}{d\theta}\right)} \times \cos\left(\frac{\theta_c}{2}\right) \leq 1.05,$$

where $Y_a$, $Y_b$, and $Y_c$ represent coordinates in the main scanning direction of the on-axis image height, the outermost off-axis image height on one side, and the outermost off-axis image height on another side, respectively, $\theta$ represents an angle formed by a traveling direction of a principal ray of the light flux traveling toward a predetermined image height when the light flux is deflected by the deflecting unit with respect to the optical axis of the optical system, and $\theta_b$ and $\theta_c$ represent angles formed by the traveling direction of the principal ray of the light flux traveling toward the outermost off-axis image height on the one side and the outermost off-axis image height on the another side when the light flux is deflected by the deflecting unit with respect to the optical axis of the optical system, respectively.

6. The apparatus according to claim 1, wherein the following condition is satisfied:

$$0.225\pi < |\theta_{max}| < 0.300\pi,$$

where $\theta_{max}$ (radian) represents an angle formed by a traveling direction of a principal ray of the light flux traveling toward the outermost off-axis image height when the light flux is deflected by the deflecting unit with respect to the optical axis of the optical system.

7. The apparatus according to claim 1, wherein each optical surface of the optical system has a symmetrical shape in the main scanning cross section with respect to the optical axis of the optical system.

8. The apparatus according to claim 1, further comprising an incident optical system configured to make the light flux obliquely incident on the deflecting unit in a sub-scanning cross section.

9. The apparatus according to claim 8, wherein an optical axis of the incident optical system and the optical axis of the optical system are parallel to each other in the main scanning cross section.

10. An image forming apparatus comprising:

the apparatus of claim 1;

a developing unit configured to develop, as a toner image, an electrostatic latent image formed on the scanned surface by the apparatus;

a transferring unit configured to transfer the developed toner image onto a transferred material; and a fixing unit configured to fix the transferred toner image on the transferred material.

11. The image forming apparatus according to claim 10, wherein, when an angle formed by a traveling direction of a principal ray of the light flux traveling toward a predetermined image height when the light flux is deflected by the deflecting unit with respect to the optical axis of the optical system is represented by θ, the predetermined image height is represented by Y, and an Fθ coefficient and a DIST coefficient of degree "i" of the optical system are represented by F and $\alpha_i$, respectively, and the following expression is satisfied:

$$Y = F\theta + \sum_{i=2}\alpha_i\theta^i,$$

the following conditions are satisfied:

$$\alpha_{2j} = 0;\text{ and}$$

$$\alpha_{2j+1} \le 0,$$

and at least one of $\alpha_{2j+1}$ has a negative value, where "j" represents an integer of 1 or more.

12. The image forming apparatus according to claim 10, wherein the following conditions are satisfied:

$$1.02 \le \frac{\left(\frac{dY_a}{d\theta}\right)}{\left(\frac{dY_b}{d\theta}\right)} \le 1.20;\text{ and}$$

$$1.02 \le \frac{\left(\frac{dY_a}{d\theta}\right)}{\left(\frac{dY_c}{d\theta}\right)} \le 1.20,$$

where $Y_a$, $Y_b$, and $Y_c$ represent coordinates in the main scanning direction of the on-axis image height, the outermost off-axis image height on one side, and the outermost off-axis image height on another side, respectively, and θ represents an angle formed by a traveling direction of a principal ray of the light flux traveling toward a predetermined image height when the light flux is deflected by the deflecting unit with respect to the optical axis of the optical system.

13. The image forming apparatus according to claim 10, wherein the following conditions are satisfied:

$$0.95 \le \frac{\left(\frac{dY_a}{d\theta}\right)}{\left(\frac{dY_b}{d\theta}\right)} \times \cos\left(\frac{\theta_b}{2}\right) \le 1.05;\text{ and}$$

$$0.95 \le \frac{\left(\frac{dY_a}{d\theta}\right)}{\left(\frac{dY_c}{d\theta}\right)} \times \cos\left(\frac{\theta_c}{2}\right) \le 1.05,$$

where $Y_a$, $Y_b$, and $Y_c$ represent coordinates in the main scanning direction of the on-axis image height, the outermost off-axis image height on one side, and the outermost off-axis image height on another side, respectively, θ represents an angle formed by a traveling direction of a principal ray of the light flux traveling toward a predetermined image height when the light flux is deflected by the deflecting unit with respect to the optical axis of the optical system, and $\theta_b$ and $\theta_c$ represent angles formed by the traveling direction of the principal ray of the light flux traveling toward the outermost off-axis image height on the one side and the outermost off-axis image height on the another side when the light flux is deflected by the deflecting unit with respect to the optical axis of the optical system, respectively.

14. The image forming apparatus according to claim 10, wherein the following condition is satisfied:

$$0.225\pi < |\theta_{max}| < 0.300\pi,$$

where $\theta_{max}$ (radian) represents an angle formed by a traveling direction of a principal ray of the light flux traveling toward the outermost off-axis image height when the light flux is deflected by the deflecting unit with respect to the optical axis of the optical system.

15. An image forming apparatus comprising:

the apparatus of claim 1; and a printer controller configured to convert a signal output from an external apparatus into image data to input the image data to the apparatus.

16. The image forming apparatus according to claim 15, wherein, when an angle formed by a traveling direction of a principal ray of the light flux traveling toward a predetermined image height when the light flux is deflected by the deflecting unit with respect to the optical axis of the optical system is represented by θ, the predetermined image height is represented by Y, and an Fθ coefficient and a DIST coefficient of degree "i" of the optical system are represented by F and $\alpha_i$, respectively, and the following expression is satisfied:

$$Y = F\theta + \sum_{i=2}\alpha_i\theta^i,$$

the following conditions are satisfied:

$$\alpha_{2j} = 0;\text{ and}$$

$$\alpha_{2j+1} \le 0,$$

and at least one of $\alpha_{2j+1}$ has a negative value, where "j" represents an integer of 1 or more.

17. The image forming apparatus according to claim 15, wherein the following conditions are satisfied:

$$1.02 \le \frac{\left(\frac{dY_a}{d\theta}\right)}{\left(\frac{dY_b}{d\theta}\right)} \le 1.20\text{; and}$$

$$1.02 \le \frac{\left(\frac{dY_a}{d\theta}\right)}{\left(\frac{dY_c}{d\theta}\right)} \le 1.20,$$

where $Y_a$, $Y_b$, and $Y_c$ represent coordinates in the main scanning direction of the on-axis image height, the outermost off-axis image height on one side, and the outermost off-axis image height on another side, respectively, and θ represents an angle formed by a traveling direction of a principal ray of the light flux traveling toward a predetermined image height when the light flux is deflected by the deflecting unit with respect to the optical axis of the optical system.

18. The image forming apparatus according to claim 15, wherein the following conditions are satisfied:

$$0.95 \le \frac{\left(\frac{dY_a}{d\theta}\right)}{\left(\frac{dY_b}{d\theta}\right)} \times \cos\left(\frac{\theta_b}{2}\right) \le 1.05\text{; and}$$

$$0.95 \le \frac{\left(\frac{dY_a}{d\theta}\right)}{\left(\frac{dY_c}{d\theta}\right)} \times \cos\left(\frac{\theta_c}{2}\right) \le 1.05,$$

where $Y_a$, $Y_b$, and $Y_c$ represent coordinates in the main scanning direction of the on-axis image height, the outermost off-axis image height on one side, and the outermost off-axis image height on another side, respectively, θ represents an angle formed by a traveling direction of a principal ray of the light flux traveling toward a predetermined image height when the light flux is deflected by the deflecting unit with respect to the optical axis of the optical system, and $\theta_b$ and $\theta_c$ represent angles formed by the traveling direction of the principal ray of the light flux traveling toward the outermost off-axis image height on the one side and the outermost off-axis image height on the another side when the light flux is deflected by the deflecting unit with respect to the optical axis of the optical system, respectively.

19. The image forming apparatus according to claim 15, wherein the following condition is satisfied:

$$0.225\pi < |\theta_{max}| < 0.300\pi,$$

where $\theta_{max}$ (radian) represents an angle formed by a traveling direction of a principal ray of the light flux traveling toward the outermost off-axis image height when the light flux is deflected by the deflecting unit with respect to the optical axis of the optical system.

20. An apparatus comprising:

a deflecting unit configured to deflect a light flux from a light source to scan a surface in a main scanning direction while rotating at a constant angular velocity; and an optical system configured to guide the deflected light flux onto the scanned surface, wherein, in a main scanning cross section including an optical axis of the optical system, a width of the light flux on a deflecting surface of the deflecting unit is larger than a width of the deflecting surface, wherein, when an angle formed by a traveling direction of a principal ray of the light flux traveling toward a predetermined image height when the light flux is deflected by the deflecting unit with respect to the optical axis of the optical system is represented by θ, the predetermined image height is represented by Y, and an Fθ coefficient and a DIST coefficient of degree "i" of the optical system are represented by F and $\alpha_i$, respectively, and the following expression is satisfied:

$$Y = F\theta + \sum_{i=2}\alpha_i\theta^i,$$

the following conditions are satisfied:

$$\alpha_{2j} = 0\text{; and}$$

$$\alpha_{2j+1} \le 0,$$

and at least one of $\alpha_{2j+1}$ has a negative value, where "j" represents an integer of 1 or more.

* * * * *